United States Patent
Rodriguez

(10) Patent No.: US 7,340,759 B1
(45) Date of Patent: Mar. 4, 2008

(54) SYSTEMS AND METHODS FOR ADAPTIVE PRICING IN A DIGITAL BROADBAND DELIVERY SYSTEM

(75) Inventor: Arturo A. Rodriguez, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 812 days.

(21) Appl. No.: 09/709,145

(22) Filed: Nov. 10, 2000

(51) Int. Cl.
*H04N 7/16* (2006.01)

(52) U.S. Cl. ......................................................... 725/8

(58) Field of Classification Search .................. 725/47, 725/8
See application file for complete search history.

(56) References Cited

U.S. PATENT DOCUMENTS

| | | | |
|---|---|---|---|
| 5,532,735 A * | 7/1996 | Blahut et al. | 725/32 |
| 5,764,899 A * | 6/1998 | Eggleston et al. | 709/203 |
| 5,802,502 A * | 9/1998 | Gell et al. | 705/37 |
| 5,838,314 A * | 11/1998 | Neel et al. | 725/8 |
| 6,006,257 A * | 12/1999 | Slezak | 725/110 |
| 6,057,872 A * | 5/2000 | Candelore | 725/23 |
| 6,157,377 A * | 12/2000 | Shah-Nazaroff et al. | 345/719 |
| 6,697,376 B1 * | 2/2004 | Son et al. | 370/465 |
| 6,701,528 B1 * | 3/2004 | Arsenault et al. | 725/89 |
| 2001/0044744 A1 * | 11/2001 | Rhoads | 705/14 |

* cited by examiner

*Primary Examiner*—Hunter B. Lonsberry

(57) ABSTRACT

Methods and systems are provided for dynamically pricing viewing options in a digital broadband communication network by receiving bandwidth allocation information from a bandwidth allocation manager and dynamically assigning a price criterion to each of a group of viewing options based at least in part on the bandwidth allocation information. The group of viewing options may, for example, comprise a reservation option, a normal-play option, a random access option, an on-demand random access option, and an adjust preference option. In addition, the method may optionally comprise receiving a subscriber request related to at least one viewing option selected from the group of viewing options and transmitting a price criterion for the viewing option to the subscriber in response to the subscriber request. The subscriber request may comprise, for example, a request for a price criterion for a viewing option, a request for viewing a program according to a viewing option, and/or a request for a list of available viewing options. In addition, the price criterion may be based, in part, on subscriber profile data.

44 Claims, 4 Drawing Sheets

SYSTEMS AND METHODS FOR ADAPTIVE PRICING IN A DIGITAL BROADBAND DELIVERY SYSTEM

FIELD OF THE INVENTION

The present invention relates to digital broadband delivery systems. More particularly, the invention relates to a pricing system for use in a digital broadband delivery system.

BACKGROUND OF THE INVENTION

Over the past twenty years there has been a dramatic and continual increase in the number and types of television programming available to television viewers. Traditional delivery systems, such as broadcast television, however, are limited in that the programming provided is temporally fixed—that is a viewer must tune into a particular broadcast at the time when it is shown. Although traditional delivery models have the advantage of allowing virtually unlimited increases in audience size, these models are inconvenient because they do not allow television viewers to alter the broadcast pattern to comport to their own viewing patterns.

For many years now, attempts have been made to develop new delivery systems that provide users with more control over broadcast programming. Ideally, it should be possible for most viewers to obtain access to particular content at the time of their choosing, notwithstanding the time of day or the number of other viewers simultaneously requesting access. It is also desirable for each viewer to have the ability to perform random-access operations on the program such as Play, Pause, Fast Forward, Rewind, Stop, and Resume Play as in a conventional Video Cassette Recorder. This delivery model is known as true "video-on-demand" (VOD). The problem with implementing a true VOD system is that the most intuitively simple solution, in which a central service provides a separate transmission of a program to individual subscribers upon their requests, requires duplication of equipment and substantial bandwidth resources. Despite recent advances in video compression technology, there still exists a limited amount of bandwidth that may be used to fulfill viewer demands. For this reason, numerous research efforts have been undertaken in an effort to simulate true VOD service by providing viewers with more options while minimizing the number of channels, and consequently the amount of bandwidth, used to broadcast any one program.

One solution is a technique known as "near video-on-demand" (NVOD). In this delivery system, programs that are in high demand are broadcast on multiple channels with a short, preset interval between the starting time of each program broadcast. For example, a two-hour movie may be broadcast on seven consecutive channels with the starting broadcast time of each channel offset by fifteen minutes from that of a neighboring channel, such that the beginning of the movie is effectively available on one of the channels once every fifteen minutes. A problem with such NVOD systems is that the programs being broadcast are predetermined and are shown in temporally fixed intervals. As such, a viewer wishing to watch such programs must choose from among the available options without having any opportunity to influence either the selection of the program (i.e. the particular movie), the times at which it is broadcast, or the frequency of which the program is broadcast (the transmission interval).

Other delivery systems have attempted to alleviate some of the problems associated with traditional NVOD systems by altering the manner in which the programs are transmitted from the video server to each individual viewer. Examples of such systems are disclosed in U.S. Pat. No. 6,018,359, invented by Kermode, et al. entitled System and method for multicast video-on-demand delivery system; and U.S. Pat. No. 5,936,659, invented by Viswanathan, et al., entitled Method for video delivery using pyramid broadcasting.

In the Viswanathan method, each program is divided into geometrically increasing size with the server transmission capacity evenly divided into a preset number of logical channels. Each channel broadcasts an assigned segment repeatedly, in an infinitely looping fashion. The viewer's receiver sequentially downloads the various video segments, playing back previously downloaded segments even as new segments are loaded. Playback commences as soon as the first segment is fully downloaded and since this segment is the shortest, the time period between receiving a view request and the time of playback is relatively short.

In the Kermode, et al. method, video files are divided into sequentially organized data segments. The Kermode method provides the advantage of allowing the data segments to be downloaded asynchronously, i.e. download of a new segment need not await the arrival of the initial (or previous) segment over the transmission channel. The length of the data segments is chosen so that a set number of channels are used efficiently and the receiver is capable of receiving data from no less than two channels. The received data is then reordered by the receiver prior to playback.

At least one of the problems associated with these types of systems is that they normally require a storage device or large amounts of memory at the receiver to enable program downloading and uninterrupted program view. Moreover, these systems afford little flexibility to the viewer in determining which programs are shown. Although these methods eliminate some of the problems with traditional delivery mechanisms, they do not alleviate the problem inherent in broadband delivery systems, i.e., limited bandwidth. Because broadband delivery systems must continue to offer conventional and emerging broadcast services and offer services at a cost attractive to consumers, they must manage channel usage effectively. Consequently, only a finite number of channels are available and only certain programs may be shown. Although these methods allow certain pre-selected programs to be requested and viewed almost immediately, only a limited number of programs can be offered at any one time. Because the programs offered must be determined ahead of time, viewers have no way to express which movies they prefer to see nor the capability to enact random access operations on the broadcast programming.

Existing systems also fail to take into account the viewer's willingness to pay a premium in return for advanced flexibility and random access features. Because current bandwidth allocation systems pre-allocate bandwidth to particular types of content delivery modes, the price charged to the viewer for viewing a program under each type of content delivery mode is fixed ahead of time. Thus, a viewer who desires to watch a movie at a time other than the predetermined time is left with no option, even if the user is willing to pay enough money to make it more profitable to change the predetermined schedule to comply with the consumers preference. Moreover, the prices charged for each program normally have little relation to the amount of bandwidth consumed by the program because the prices are the same for every program. Furthermore, prices normally do not incorporate the willingness of a consumer to wait for available bandwidth nor adjustments according to supply and demand such as those reflected by the time of bandwidth consumption.

Thus, there is a need for a delivery system which includes a means for intelligent and efficient management of bandwidth allocation in a manner that makes optimal use of the available bandwidth and provides viewers with a greater degree of control over bandwidth allocation and varied pricing options. In addition, as viewers are provided with more control over bandwidth allocation and a plurality of content delivery modes become available, there is a need for a pricing system that takes advantage of the more efficient bandwidth allocation.

SUMMARY OF THE INVENTION

A method is provided for dynamically pricing viewing options in a digital broadband communication network by receiving bandwidth allocation information from a bandwidth allocation manager and dynamically assigning a price criterion to each of a plurality of viewing options based at least in part on the bandwidth allocation information. The plurality of viewing options may, for example, comprise a reservation option, a normal-play option, a random access option, an on-demand random access option, and an adjust preference option. Advantageously, the present invention enables cable operators to adaptively price viewing options to take into account bandwidth allocation information and a subscriber's willingness to pay additional fees for the enhanced flexibility and advanced random access features made available by dynamic bandwidth allocation. The present invention also enables cable operators to adapt their pricing schemes based on the viewing options available under the bandwidth allocation determined by the bandwidth allocation manager.

In addition, the method of the present invention may also comprise receiving a subscriber request related to at least one viewing option selected from the plurality of viewing options and transmitting a price criterion for the viewing option to the subscriber in response to the subscriber request. The subscriber request may comprise, for example, a request for a price criterion for a viewing option, a request for viewing a program according to a viewing option, and/or a request for a list of available viewing options. In addition, one or more price criteria may be based, in part, on subscriber profile data. Advantageously, this enables cable operators to assign variable price criteria to each available viewing option and to assign adjustable or different price criteria to each individual subscriber for the same viewing option according to a number of factors such as a subscriber's viewing pattern or purchase history. It will be appreciated that, cable operators may use this flexibility to reward valued customers or to provide incentives to targeted subscriber groups.

According to another embodiment of the present invention, a pricing system for a digital broadband delivery system receives bandwidth allocation information from a bandwidth allocation manager and dynamically assigns a price criterion to a plurality of viewing options based at least in part on the bandwidth allocation information. The plurality of viewing options may comprise, for example, a reservation option, a normal-play option, a random access option, an on-demand random access option, and an adjust preference option. The pricing system may also optionally receive a subscriber request related to at least one viewing option selected from the plurality of viewing options and transmit at least one price criterion to the subscriber in response to the subscriber request. The subscriber request received by the pricing system may comprise, for example, a request for a price criterion for a viewing option, a request for viewing a program according to a viewing option, or a request for a list of available viewing options. In addition, the price criterion for at least one viewing option selected from the plurality of viewing options may be based at least in part on subscriber profile data, time of bandwidth consumption (e.g. the time of day or day of week that bandwidth is consumed by a particular viewing option or use of a random access feature), and/or a subscriber viewing time preference (e.g. the amount of time the subscriber is willing to wait until a viewing option can be rendered).

In another embodiment of the present invention, a headend in a digital broadband delivery system comprises a bandwidth allocation manager that determines bandwidth allocation by dynamically assigning a content delivery mode to a plurality of digital transmission channels and a pricing system that receives bandwidth allocation information from the bandwidth allocation manager and dynamically assigns a price criterion to each of a plurality of viewing options based at least in part on the bandwidth allocation information received from the bandwidth allocation manager. As with the embodiments described above, the plurality of viewing options may comprise, for example, a reservation option, a normal-play option, a random access option, an on-demand random access option, and an adjust preference option.

According to yet another embodiment of the present invention, a digital broadband delivery system comprises a headend comprising a bandwidth allocation manager that determines bandwidth allocation by dynamically assigning a content delivery mode to a plurality of digital transmission channels and a pricing system that receives bandwidth allocation information from the bandwidth allocation manager and dynamically assigns a price criterion to each of a plurality of viewing options based at least in part on the bandwidth allocation information. The digital broadband delivery system also comprises a digital home communication terminal comprising an interface that receives a subscriber request regarding one of the plurality of viewing options and a tuner that transmits the subscriber request to the headend. In addition, the digital home communication terminal may optionally comprise an interface for displaying a price criterion received from the headend in response to the subscriber request.

It will be appreciated that the present invention enables cable operators to influence subscriber viewing patterns by adaptively pricing various viewing options. Advantageously, the pricing system of the present invention also enables the subscriber to choose from multiple viewing options with different associated price criteria to make more efficient use of the available bandwidth and takes into account the subscriber's willingness to pay additional fees for added convenience or functionality. Moreover, by adaptively assigning price criteria to the subscriber's viewing options, the present invention enables cable operators to charge subscribers fees based on real-time bandwidth usage and to assign higher prices to bandwidth usage occurring during peak periods, thus making it possible to collect additional revenue during those periods. Other features and advantages of the present invention will become apparent to one skilled in the art upon examination of the following drawings and detailed description. It is intended that all such features and advantages be included herein within the scope of the present invention as defined by the appended claims.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Digital Broadband Delivery Systems

Figure 1:
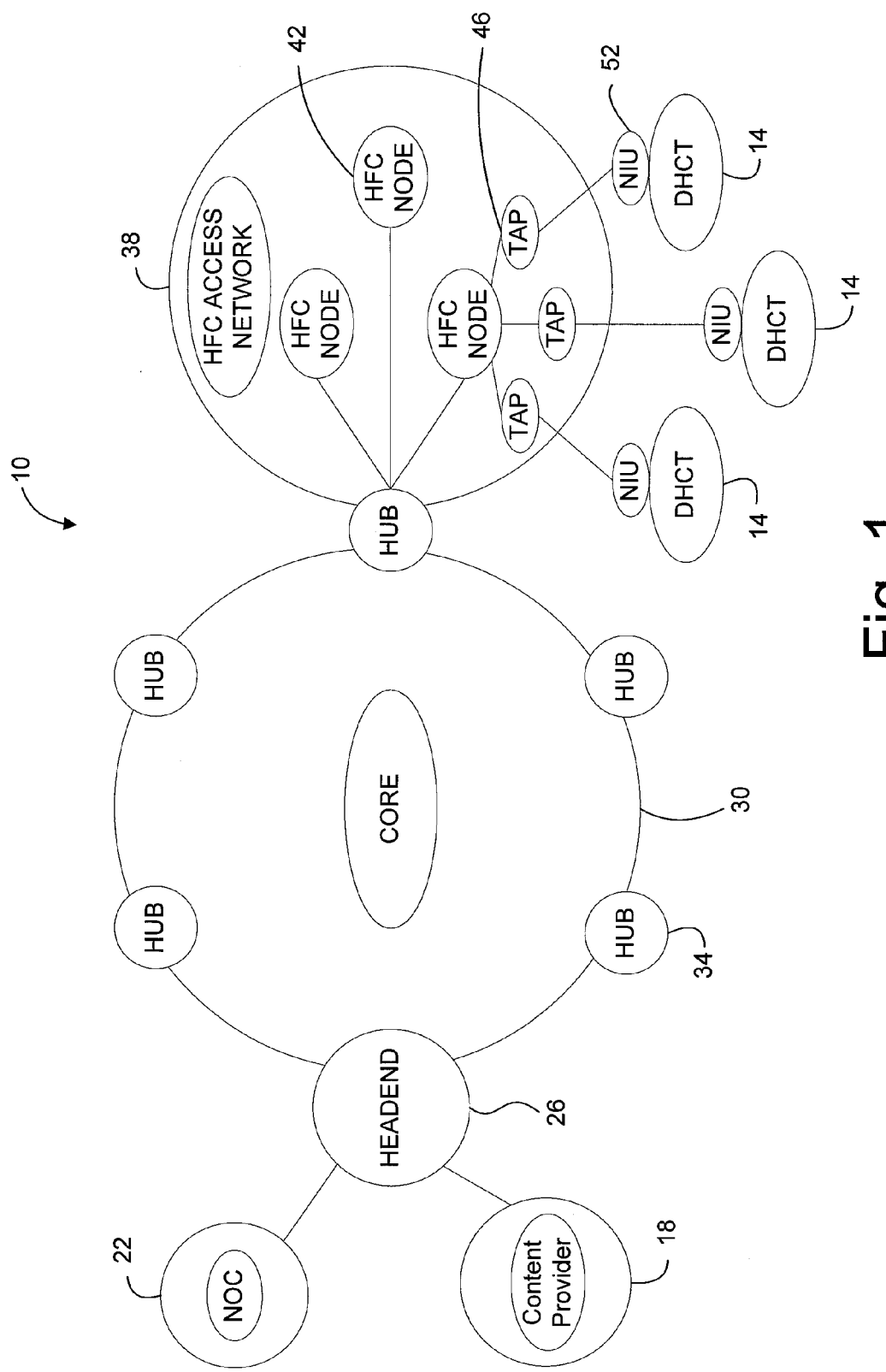
FIG. 1 is a block diagram of a Digital Broadband Delivery System (DBDS) in accordance with an aspect of the invention.

The present invention is generally implemented as part of a Digital Broadband Delivery System (DBDS). Hence, an illustrative DBDS and its operation will be described initially. FIG. 1 shows a block diagram view of a DBDS 10 that is generally a high quality, reliable and integrated network system that features video, audio, voice and data services to Cable TV subscribers. Although FIG. 1 depicts a high level view of a DBDS including a regional hybrid/fiber coax (HFC) access network 38, as will be described below, it should be appreciated that a plurality of DBDSs can tie together a plurality of regional networks into an integrated global network so that Cable TV subscribers can receive content provided from anywhere in the world. The DBDS 10 shown in FIG. 1 delivers broadcast video signals as digitally formatted signals in addition to delivering traditional broadcast analog video signals. Furthermore, the system can support one way broadcast services as well as both one-way data services and two-way media and data services. The two-way operation of the network allows for subscriber interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and Electronic Program Guide (EPG) applications.

The DBDS 10 provides the interfaces, network control, transport control, session control, and servers to access content and services, and distributes content and services to Cable TV subscribers. As shown in FIG. 1, a typical DBDS 10 is composed of interfaces to content providers 18, network operations centers (NOC) 22, core networks 30 of headends 26, hubs 34, HFC access networks 38, and subscribers' digital home communication terminals (DHCTs) 14. It should be appreciated that although single components (e.g., headend 26, core network 30, HFC access network 38, etc.) are illustrated in FIG. 1, a DBDS 10 can feature a plurality of any one of the illustrated components or may be configured with alternative embodiments for any one of the individual components or with yet other additional components not enumerated above.

The content provider 18 represents one or more providers of content, such as video channels, music channels, data channels, video services, audio services and data services. For example, the content provider 18 could comprise a video/audio media provider or an Internet service provider (ISP) providing data to the system to enable subscribers web access or web-enhanced video via the subscriber's television set. The content provider 18 transmits the content to a headend 26 for further transmission to subscribers downstream in the network. Also in communication with the headend 26 is a network operation center (NOC) 22, which is an external management center interfaced with DBDS 10 to allow for the remote operation of the system.

Content provided by the content provider 18 is communicated by the content provider 18 to one or more headends 26. From those headends 26 the content is then communicated to the core network 30 of hubs 34 and onto a plurality of HFC access networks (only one HFC access network 38 is illustrated). The HFC access network 38 typically comprises a plurality of HFC nodes 42, each of which may service a local geographical area. The content provided from the content provider 18 is transmitted through the headend 26, hub 34 and HFC access network 38 downstream to one or more taps 46 from each one of the HFC nodes 42 of the HFC access network 38. The hub 34 connects to the HFC node 42 through the fiber portion of the HFC access network 38. Usually, the HFC node 42 connects to a subscriber's DHCT 14 through coaxial cable in a logical tree configuration, which is where the optical-to-electrical and electrical-to-optical conversations of the HFC network take place. From the HFC node 42 a coaxial drop connects the tap 46 to a network interface unit (NIU) 52, which is a network demarcation point normally located on the side of the subscribers' homes. The NIU 52 provides a transparent interface between the HFC node 42 and the subscribers' internal wiring. Coaxial cables are preferred in this part of the system because the electrical signals can be easily repeated with radio frequency (RF) amplifiers. Typically, six or fewer amplifiers are located in series between the HFC node 42 and the subscribers' DHCTs 14.

Figure 2:
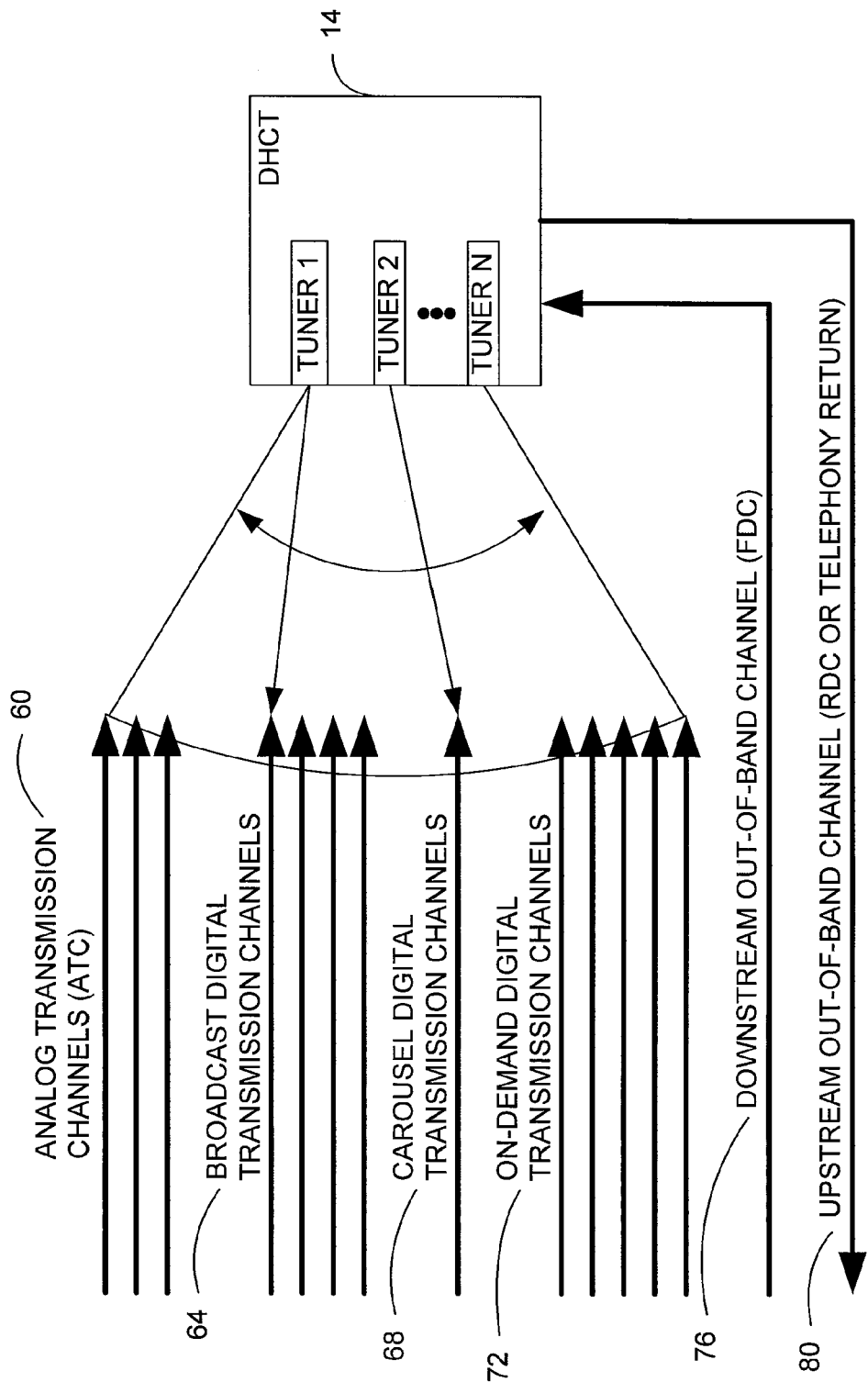
FIG. 2 is a schematic illustration of the input channels supported by a DBDS and the input of these channels into a digital home communication terminal (DHCT) according to one aspect of the invention.

As the high-level operation of DBDSs is well known to those of skill in the art, further description of the overall DBDS 10 of FIG. 1 will not be contained herein. It will be appreciated, however, that the DBDS shown in FIG. 1 is merely illustrative and should not be construed as implying any limitations upon the scope of the present invention. Because the form and content provided to the subscribers DCHT 14 by the DBDS 10 is useful to understanding the purpose, operation and function of the present invention, the data provided by the DBDS to the DCHT will next be discussed with reference to FIG. 2. FIG. 2 shows illustrative channels supported by the DBDS, where the channels 60, 64, 68, 72 and 76 are input into a DHCT 14. The content contained in these input channels is mostly provided by the one or more content providers 18 illustrated in FIG. 1. A portion of the content may be generated at a headend 26 or at a hub 34 that might function as a mini-headend and thus possesses some of the headend functionality.

As depicted in FIG. 2, the DBDS 10 can simultaneously support a number of transport channel types and modulation formats. Although not shown in FIG. 2, the DBDS 10 may also support multiple in-band tuners. The ability to carry analog and digital signals over a large bandwidth are characteristics of an HFC network typically employed in a DBDS, as in the DBDS 10 of FIG. 1. As will be appreciated by those of skill in the art, analog and digital signals in HFC networks can be multiplexed using frequency division multiplexing (FDM), which enables many different types of signals to be transmitted over the DBDS 10 to the DHCT 14. Typically, a DBDS using HFC supports downstream (i.e., in the direction from the headend to the DHCT) frequencies from 50 MHz to 870 MHz, whereas upstream frequencies (i.e., in the direction from the DHCT to higher levels of the system) are in the 5 MHz to 42 MHz band. Generally, the RF channel bandwidth spacing for analog and digital services is 6 MHz. Furthermore, for a 870 MHz system in the U.S., a possible downstream RF spectrum subdivision plan uses 6 MHz spaced RF channels within the 50 MHz to 550 MHz band for analog video carriers and within the 550 MHz to 870 MHz range for digital carriers. It will be appreciated, however, that the present invention may also be implemented on other HFC networks that employ other subdivision plans.

Referring again to FIG. 2, the downstream direction channels, having been multiplexed using FDM, and often referred to as in-band channels, include Analog Transmission Channels (ATCs) 60 and Digital Transmission Channels (DTCs) 64, 68, 72 (also known as Digital Transport Channels). These channels carry video, audio and data services. For example, these channels may carry television signals, Internet data, or any additional types of data such as EPG data and VOD Catalog data. VOD Catalog data may comprise information such as program titles, respective pricing information or pricing alternatives, respective program descriptions, program attributes and characteristics, or other similar data or descriptors as found in the electronic program data. The signals and data carried on these channels are collectively referred to herein as services. The ATCs 60 shown in FIG. 2 are typically broadcast in 6 MHz RF channels having an analog broadcast composed of analog video and analog audio, and include Broadcast TV Systems Committee (BTSC) stereo and Secondary Audio Program (SAP) audio. Additionally, as will be appreciated by those of skill in the art, additional data, such as EPG and VOD Catalog information, can be sent with the analog video image in the Vertical Blanking Interval (VBI) of the video signal.

Like the ATCs 60, the DTCs 64, 68, 72 each typically occupies 6 MHz of the RF spectrum. However, the DTCs 64, 68, 72 are digital channels typically consisting of 64- or 256-Quadrature Amplitude Modulated (QAM) digital signals formatted as MPEG-2 transport streams, and allocated in a separate frequency range. As will be described in more detail below, the MPEG-2 transport stream enables transmission of a plurality of DTC types over each 6 MHz RF spacing. The three types of digital transport channels illustrated in FIG. 2 include broadcast digital transmission channels 64, carousel digital transmission channels 68, and on-demand transmission channels 72.

MPEG-2 transport may be used to multiplex video, audio, and data in each of these DTCs. However, because MPEG-2 transport streams allow for multiplexing video, audio, and data into the same stream, the DTCs do not necessarily have to be allocated in separate 6 MHz RF frequencies, unlike ATCs 60. Each DTC is capable of carrying multiple broadcast digital video programs, multiple cycling data carousels containing broadcast data, and data requested on-demand by the subscriber. Data is formatted, such as in Internet Protocol (IP), mapped into MPEG-2 packets, and inserted into the multiplexed MPEG-2 transport streams. Encryption techniques can be applied to the data stream as applicable for security so that the multiplexed data may be received only by authorized DHCTs. For example, one individual subscriber may be authorized to receive certain broadcast and/or on-demand data, while others may be authorized to receive additional and/or different broadcast or on-demand data according to a predetermined or aggregate service fee or a volatile service fee structure. Therefore, additional subscribers in the same local area not authorized to view selected transmission channels will not be able to do so. The capability to send individualized data to the subscriber may serve as a mechanism to send individualized pricing and incentives to viewers that are frequent service purchasers. It will be appreciated that each 6 MHz RF spacing assigned as a digital transmission channel can carry the video and audio streams of the programs of multiple television (TV) channels, as well as media and data that is not necessarily related to those TV programs or TV channels, as compared to one TV channel broadcast over one ATC 60 that consumes the entire 6 MHz. The digital data is inserted into MPEG transport streams for each 6 MHz RF channel assigned for digital transmission, and then de-multiplexed at the subscribers' DHCT so that multiple sets of data can be produced within each tuned 6 MHz frequency span.

Continuing with FIG. 2, the broadcast DTCs 64 and carousel DTCs 68 typically function as continuous feeds for indefinite time, whereas the on-demand DTCs 72 are typically continuous feed sessions for a limited time. All DTC types are capable of being transmitted at high data rates. The broadcast DTCs 64 carry typical data comprising multiple digitally-MPEG-2 compressed and formatted TV channels and other continuously fed data information. The carousel DTCs 68 typically carry high-volume broadcast data, such as EPG data, VOD Catalog data and respective pricing information, that is systematically updated and revised. Typically, the carousel DTCs 68 also carry data formatted in directories and files by a Broadcast File System (BFS), which is used for producing and transmitting data streams throughout the DBDS, and which provides an efficient means for the delivery of application executables and application data to the DHCT. The on-demand DTCs 72, on the other hand, can carry particular information such as compressed video and audio pertaining to subscriber requested video services, program previews, and program descriptions, as well as other specialized data information.

Although broadcast in nature, the carousel DTCs 68 and on-demand DTCs 72 offer different functionality. The User-to-Network Download Protocol of the MPEG-2 standard's DSM-CC specification (Digital Storage Media—Command and Control) provides the data carousel protocol used for broadcasting data from a Server located at headend 26. It also provides the interactive download protocol for reliable downloading of data from a Server (possibly the same server) to an individual DHCT through the on-demand DTCs. Each carousel and on-demand DTC is defined by a DSM-CC session.

Also shown in FIG. 2 is a Out-Of-Band (OOB) channel that provides a continuously available two-way signaling path to the subscribers' DHCT 14 regardless of which in-band channels are tuned to by an individual DHCT in-band tuner. The DHCT 14 may also comprise multiple in-band tuners in which case the OOB channel complements the service of the set of in-band tuners. The OOB channel consists of a forward data channel (FDC) 76 and a reverse data channel (RDC) 80. The OOB channel can comply to any one of a number of well known transport protocols but preferably complies to either a DAVIC 1.1 Transport Protocol with FDC of 1.544 Mbps or more using QPSK modulation and an RDC of 1.544 Mbps or more using QPSK modulation, or to a DOCSIS Transport Protocol with FDC of 27 Mbps using 64-QAM modulation and a RDC of 1.544 Mbps or more using QPSK modulation or 16-QAM modulation. The OOB channels provide the two-way operation of the network, which allows a subscriber interactivity with the services provided by the network. Therefore, the DHCT 14 typically contains functionality similar to a networked computer (i.e., a computer without a persistent storage device) in addition to traditional set top box functionality, as is well known in the art. Furthermore, the OOB channels are not limited to a 6 MHz spectrum, but generally to a smaller spectrum, such as 1.5 or 3 MHz.

Figure 3:
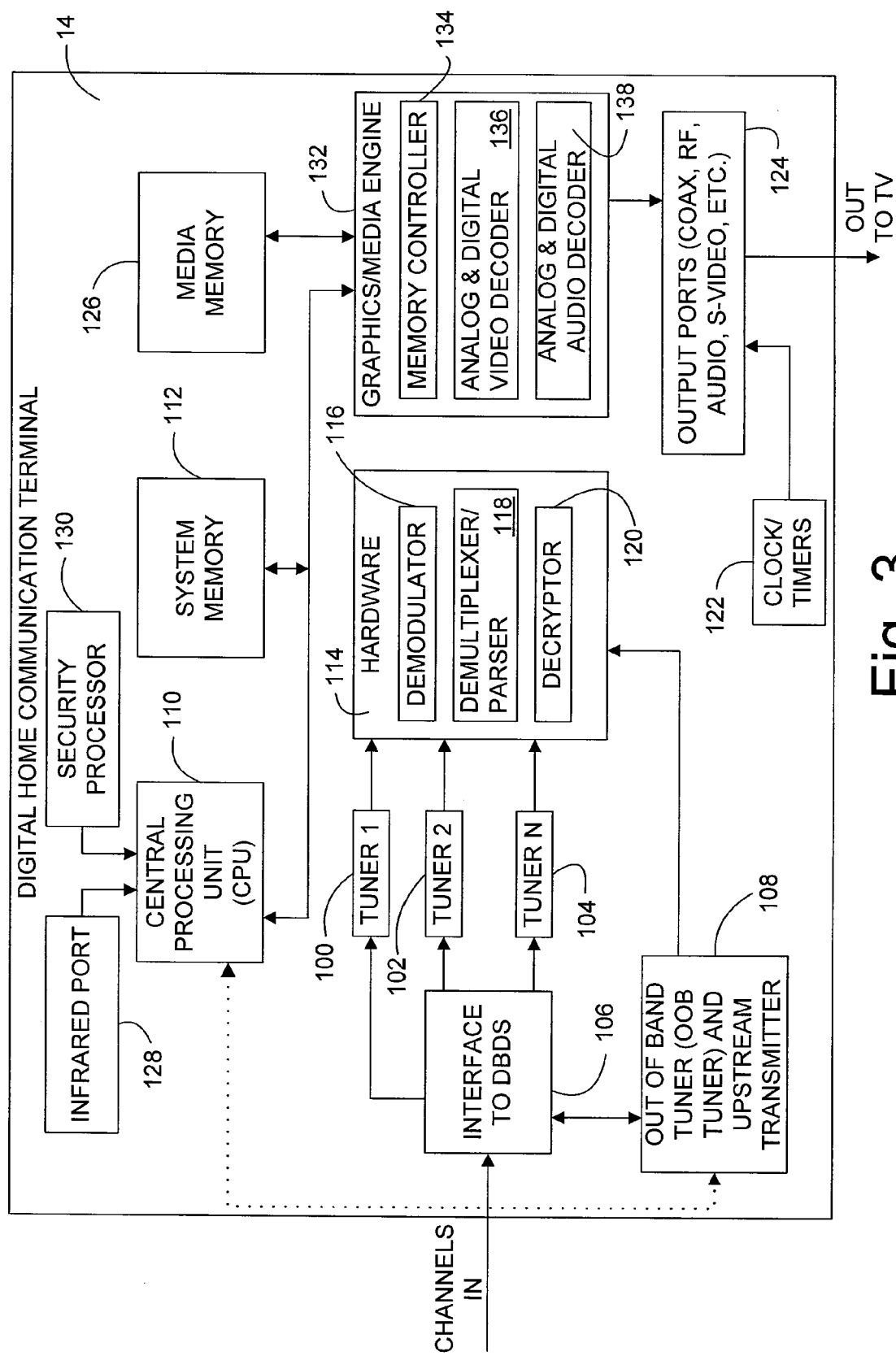
FIG. 3 is a block diagram of certain components to an exemplary DHCT suitable for operation as the DHCT of FIG. 2, according to one aspect of the present invention.

FIG. 3 is a block diagram showing the components comprising one possible configuration of a DHCT 14 according to the present invention. The DHCT 14 includes an interface to the DBDS 10 through which the DHCT 14 receives data from a plurality of analog or digital channels, including analog and digital broadcast TV programs and services, including video, audio and data, and even data channels such as DOCSIS cable modem channels. The DHCT 14 includes at least one tuner 100, and possibly additional multiple tuners 102, 104, preferably capable of receiving signals from an HFC Plant (e.g., an 870 MHz HFC Plant), and capable of analog and digital (64/256 QAM) tuning to a single RF channel from a multiplicity of spaced RF channels (e.g., 6 MHz spaced RF channels in the US, 8 MHz in Europe).

Also included within the DHCT 14 are an OOB tuner and upstream transmitter 108, which is connected to the interface of DBDS 10. It should be appreciated that although the OOB tuner and upstream transmitter are illustrated as one component in FIG. 3, the tuner and transmitter can be independent of each other and located separately within the DHCT 14. Nonetheless, both components should be in communication with the DBDS so that upstream transmissions can be received by the system. The OOB tuner and upstream transmitter 108 enables the DHCT 14 to interface with a DBDS network so that the DHCT 14 can provide upstream data to the network, for example, via a QPSK channel or a QAM channel. In this manner, a subscriber can interact with the DBDS to request services, such as Pay-Per-View programming, View-On-Demand programs, more comprehensive EPG data for desired programs, and data associated with VOD programs and services. Data associated with VOD programs and services may comprise data to populate the entries of a Video Catalogue that is presented to the subscriber via a Graphical-User-Interface (GUI) from which a subscriber selects and purchases movies, retrieves program information for the respective VOD movie titles, and from which the subscriber enters subscriber selection criteria and/or preferences. The VOD Catalogue data set may also comprise database records containing program information such as program showing times, program titles, program descriptions, program genres, program release years, casts lists, ratings information, price criteria (or combinations of multiple price criteria) associated with various viewing options, program durations, and/or links to additional respective program related information such as a program previews and critic's reviews and comments. The effective window of calendar days in which a program is purchasable may also be included. As is described in more detail below, the VOD Catalogue data may also comprise one or more database records pertaining to variable fee structures for a particular program.

The DHCT 14 preferably includes an infrared receiver 128 for receiving externally generated information such as subscriber input via an input device such as an Infrared (IR) remote control. The DHCT 14 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons. Signals generated by such input devices are received by a communication port or receiver in DHCT 14 and consequently interpreted by CPU 110 or other processor in DHCT 14 and passed as input data to the VOD software program residing in system memory 112.

The system memory 112 of the DHCT 14 may include flash memory and dynamic random access memory (DRAM) for storing the executable programs and related data components of various applications and modules for execution by the DHCT 14. Both the flash memory and the DRAM memory are coupled to the processor 110 for storing configuration data and operational parameters, such as commands that are recognized by the processor 110.

Basic program execution functionality within the DHCT 14 is provided by an operating system that resides in system memory 112. One or more programmed software applications, herein referred to as applications, are executed by utilizing the computing resources in the DHCT 14. Any application executable program stored in system memory 112 is executed by processor 110 (e.g., a central processing unit or digital signal processor) under the auspices of the operating system. Data required as input by the application program may be stored in system memory 112 and read by processor 110 from memory 112 as needed during the course of application program execution. Input data may also be data stored in memory 112 by a secondary application or other source, either internal or external to the DHCT 14, or possibly anticipated by the application and thus created with the application program at the time it was generated as a software application program, in which case it is stored in the flash memory part of system memory 112. Data may be received via any of the communication ports of the DHCT 14, from the headend 26 via the DHCT's network interface 106 (i.e., the in-band or out-of-band tuners) or as user input via receiver 128 or some other communication port. Data generated by the application programs is stored in system memory 112 by processor 110 during the course of application program execution.

Referring still to FIG. 3, a telephone modem in the DHCT 14 can be utilized for upstream data transmission and a headend 26 or hub 34 or other component located upstream in the DBDS can receive data from a telephone network coupled to a telephone modem and can route the upstream data to a destination internal or external to the DBDS. After the one or more tuners 100, 102, 104 select one or more transmission channels, incoming data is forwarded to hardware 114 comprising circuitry with capability for demodulating 116, demultiplexing and parsing 118, and decrypting 120 the incoming signals. More specifically, the hardware components 114 are capable, among other things, of QAM demodulation, Forward Error Correction (FEC), Parsing MPEG-2 Transport Streams, Packetized Elementary Streams and Elementary Streams, and Decryption, as is well known in the art, to counter the effect of signal processing of broadcast media and data in the DBDS. Particularly, such signal processing is performed at the headend 26 and in some cases it may be performed in part at the hubs 34. Although not illustrated in FIG. 3, additional components can be included within the hardware 114, such as descramblers, decoders, digitizers, signal amplifiers, and other circuitry for signal or error recovery.

Having generally described the makeup of one possible digital broadband delivery system, it serves to point out the limitations that are often inherent in such systems. Because a limited amount of bandwidth is available for transmitting services between the DBDS 10 and the DHCT 14, decisions must be made as to how to allocate the bandwidth available for such transmission. Initially, it must be determined how much bandwidth is to be allocated for DTC usage. As stated above, for an 870 MHz system in the U.S., a possible downstream RF spectrum subdivision plan uses 6 MHz spaced RF channels within the 50 MHz to 550 MHz band for ATCs. The 550 MHz to 870 MHz range is typically designated for DTC usage. Thus, in a typical subdivision plan, the available bandwidth for DTC usage is only 220 MHz. This bandwidth must be allocated between the Broadcast, Carousel, and On-Demand DTCs. Under conventional systems, this determination is made somewhat arbitrarily based on projections of subscriber viewing patterns by assigning a predetermined portion of the available bandwidth to each type of DTC. The DTC content is then translated into MPEG-2 transport streams and transported in 6 MHz RF spaced channels.

For example, referring back to FIG. 1, if each HFC Node 42 serves five-hundred subscribers (represented by the DHCTs 14) and each hub 34 serves four HFC Nodes 42 for a total of two thousand total subscribers per hub, a cable operator may choose to allocate enough bandwidth to the On-demand DTCs to allow ten percent (10%) of the total number of subscribers to purchase a VOD service at the same time. Stated differently, only 200 out of the 2000 total subscribers can purchase a VOD service concurrently. To achieve this in a typical delivery scheme, the cable operator would need to allocate bandwidth equivalent to twenty 6 MHz RF channels solely for VOD services. Under this model, it is assumed that each 6 MHz RF channel modulated at 256 QAM can carry approximately 39.6 mega-bits of digitally compressed data per second. Under the assumption that most VOD services (such as a movie) can be transmitted at approximately 3.5 mega-bits per second, each channel can carry approximately 10 VOD services while still leaving residual bandwidth to transmit data such as data associated with VOD services (e.g., VOD Catalogue data as described above). By allocating twenty 6 MHz RF channels to VOD services, 200 movies may be simultaneously transmitted (thus enabling 200 subscribers to request VOD services).

It will be appreciated, however, that dedicating twenty 6 MHz RF channels to VOD services can consume a disproportionate percentage of the bandwidth available for DTC usage. For instance, in DBDSs that transmit DTCs within the 550 to 870 MHz frequency range, dedicating twenty channels consumes approximately 120 MHz of the available bandwidth, leaving only 100 MHz for broadcast and carousel DTC usage. Considering that very few of the twenty channels will actually be used concurrently during a multiplicity of different time periods, dedicating such a large percentage of the available bandwidth to VOD services is inefficient because a large percentage of the bandwidth is unused during those respective time periods. On the other hand, if during peak viewing periods more than 10% of the subscribers desire to purchase a VOD service, bandwidth allocated to the dedicated VOD channels will be insufficient. Therefore when the bandwidth capacity dedicated to VOD usage is fixed, as in the case when a predetermined number of 6 MHz RF channels are assigned and allocated for VOD services in advance, the DBDS will not be able to satisfy the demand during peak periods that surpass the assumed maximum number of simultaneous VOD service requests. In the foregoing example, this would transpire when the number of simultaneous VOD service requests surpasses a maximum of 200 VOD requests at any one time.

The remaining bandwidth may also be allocated inefficiently. Continuing with the above example, if 120 MHz of the available bandwidth is dedicated to VOD services, then the remaining 100 MHz can be divided between Broadcast DTCs and Carousel DTCs. Bandwidth allocation can be designed, for instance, with a delivery scheme that allocates approximately two to four 6 MHz RF channels for high volume data transmission such as electronic program guide data and Internet data. Each of these high volume data channels may have one or more Carousel DTCs and a portion of each these 6 MHz RF channels may also have a percentage of the bandwidth allocated for on-demand data such as data that augments the data found in the VOD Catalogue. The remaining twelve to fourteen 6 MHz RF channels may then be reserved for Broadcast DTC services.

As discussed above, it will be appreciated that the carousel, broadcast, and on-demand DTCs may be multiplexed and transmitted over the same RF channel. The above example merely assumes that the equivalent of two to four 6 MHz RF channels are dedicated to high volume data usage with the remainder being allocated to broadcast DTCs. In reality, all three types of DTCs may be multiplexed and transmitted in MPEG-2 transport streams over a single 6 MHz spaced RF channel.

A portion of the bandwidth allocated for broadcast DTC usage in a typical DBDS is used for pay-per-view services wherein video content is broadcast continuously at preset scheduled intervals. These channels may also be used to partially simulate VOD-type functionality, in particular, random access features such as "pause" and "play," by continually broadcasting video content according to any of several NVOD delivery schemes well-known in the art, some of which are discussed above. Such schemes, however, are typically inefficient because the bandwidth dedicated to NVOD and pay-per-view services is predetermined without taking subscriber preferences into account or giving the subscriber the opportunity to influence the allocation of the available bandwidth. Because the amount of bandwidth that can be allocated is finite, the number of movies that can be transmitted at any one time according to these content delivery modes is also limited. Thus, only certain movies can be broadcast according to the NVOD or pay-per-view models. If the majority of subscribers do not desire to view the pre-selected services, the bandwidth allocated to these services is essentially wasted because subscribers aren't tuning into the services. Furthermore, because a certain number of subscribers must view pre-selected services for profitability of pre-allocated bandwidth, during predetermined low consumption periods, the number of movies offered is lower. Consequently, a subscriber has fewer movie or start time choices during low consumption periods.

In addition to the problems discussed above, existing bandwidth allocation schemes also fail to take into account the subscribers willingness to pay more in order to have their preferences satisfied. For example, a subscriber may be willing to pay a premium to watch a particular program at a particular time or to have the ability to watch a program with full random-access features such as pause, fast-forward and rewind. Similarly, another problem with existing systems is that the prices associated with the subscriber's viewing options do not take into account subscriber demand or bandwidth usage. This may prevent the cable operator from receiving the optimal possible revenue for a limited amount of bandwidth. Another problem with existing systems is that cable operators lack the ability to influence subscriber viewing patterns to make more efficient use of the available bandwidth over time.

The present invention addresses one or more of these difficulties by either allocating bandwidth adaptively according to demand or by employing a scheme in which bandwidth allocation is adapted through time. Moreover, the present invention provides a means for bandwidth management that benefits from predetermined subscriber viewing patterns and simultaneously offers capabilities for adaptive scheduling and dynamic bandwidth resource allocation so that the available bandwidth can be allocated between the DTCs and the available content delivery modes (such as pay-per-view and VOD modes, etc.) based, at least in part, on the subscribers' expressed preferences. Furthermore, the present invention is capable of pricing subscribers viewing options based at least in part on bandwidth allocation information and usage and enables cable providers to take into account a subscriber's willingness to pay for increased convenience and advanced features. It will also be appreciated that the pricing system of the present invention enables cable operators to influence subscriber viewing patterns to make more efficient use of bandwidth available during non-peak usage periods. This is accomplished using an adaptive bandwidth allocation manager that dynamically allocates available bandwidth between the DTCs based on allocation criteria which comprises at least one subscriber criteria received from a subscriber and an adaptive pricing system that dynamically assigns a price criterion to each available viewing option based, at least in part, on information received from the bandwidth allocation manager relating to bandwidth allocation.

Figure 4:
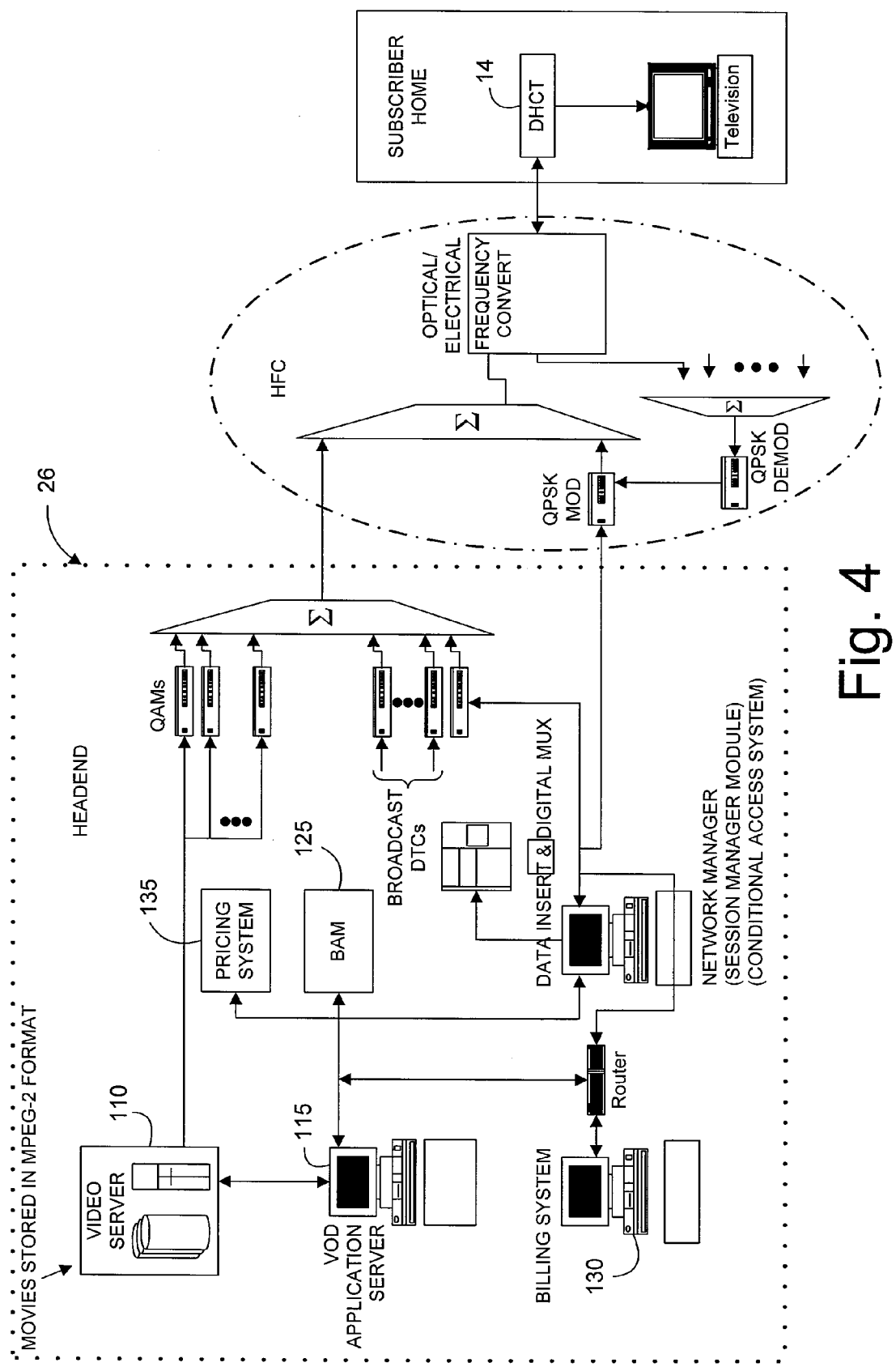
FIG. 4 is a block diagram of an exemplary headend suitable for operation as the headend of FIG. 2, according to one aspect of the present invention.

Referring now to FIG. 4, there is shown a high-level representation of a headend according to one possible embodiment of the present invention. In this embodiment, the headend 26 contains a video server 110, a video-on-demand application server 115, a network manager 120, a billing system 130, a pricing system 135, and a bandwidth allocation manager 125. It should be appreciated that although single components (e.g., video server 110, video-on-demand application server 115, network manager 120, etc.) are illustrated in FIG. 4, a headend 26 can feature a plurality of each of the illustrated components or may be configured with alternative embodiments for any one of the individual components. It should also be appreciated that, although the VOD application server 115, bandwidth allocation manager 125, network manager 120, billing system 130, and pricing system 135 are shown as separate components, these components may be combined into one or more components with similar functionality without altering the novel aspects of the present invention. For example, the pricing system 135 may be incorporated as part of the bandwidth allocation manager 125, billing system 130, or VOD application server 115 without altering the novel aspects of the present invention. It will also be appreciated that one or more of these components may be located at a location remote from the headend such as in the DHCT 14 or in a separate device in communication with the headend 26 or the DHCT 14.

The video server 110 serves as a repository for storage of video content such as digital movies. Each movie may be represented by a single "normal play" compressed video stream or, alternatively, by multiple streams representing different playback speeds and directions. For example, a single movie may be stored as three separate video streams, one for normal play, one for fast forward and one for reverse. The video content may also comprise content formatted for specific content delivery modes such as VOD or NVOD modes, some of which are described above. The video content is typically transferred from remote content providers 18 as shown in FIG. 1 and stored to the local video server 110 where it can be made available as video streams to the other equipment located within the headend 26.

The VOD application server 115 coordinates the various parts of the system and records transaction and state information in a database. It may also communicate with the billing system 130 and the pricing system 135 to insure that subscribers are charged the appropriate rate for any VOD services that may be provided. In addition, the VOD application server 115 manages the loading of video content such as movies or other programs into the video server 110 from content providers and creates a list of available video titles and associated VOD data. Part of the VOD data, such as the VOD Catalogue, may be transmitted to the DHCTs 14. Other parts of VOD data may be reside in the VOD server and be accessible to subscribers on an on-demand basis. For instance, movie previews may be requested by employing the OOB channel to carry the subscriber's request from the DHCT 14 to the VOD application server 115 to view the desired movie preview. The VOD application server 115 may also manage a self-contained database and communicate with the network manager 120 to coordinate the delivery of the VOD services from the video server 110 to the DHCT 14. It is also common for the VOD application server 115 to accept commands from a system administrator through an administration graphical user interface (GUI) to set the parameters and configurations of the VOD components throughout the DBDS. The Administration GUI (not shown) enables the system administrators to configure the system and review past activity.

The network manager 120 provides control and communication functionality by monitoring the DHCTs 14 and facilitating messaging between the DHCTs 14 and components within the headend 26. When any of the communication functionality is provided by headend components other than the network manager 120, the network manager 120 indirectly provides similar functionality by providing the control and coordination to those other devices that provide the required communication functionality to enact the services. The network manager 120 also preferably controls the multiplexing of media and data for transmission and reception over the HFC access network 38 and manages the provision of services over the DBDS 10.

The network manager 120 also typically includes a session manager module and a conditional access system. The session manager module uses the MPEG-2 DSM-CC protocol to coordinate on-demand sessions as described in further detail below. The conditional access system communicates with the DHCTs 14 and the billing system 130 to determine whether a particular subscriber is authorized to receive particular content. If a DHCT 14 is not authorized for certain services, the conditional access system insures that such services are not transmitted.

The billing system 130 communicates with the VOD application server 115, the pricing system 135, and the network manager 120 to calculate and process subscriber fee information. Information pertaining to fees associated with respective VOD services or other services may be stored locally in the memory 112 of the DHCT 14 and displayed for subscriber viewing via the presentation of a graphical user interface. Alternatively, the billing system 130 may communicate directly with bandwidth allocation manager 125 and/or the pricing system 135 to provide adaptive billing and pricing information pertaining to each available viewing option.

The pricing system 135 communicates with the bandwidth allocation manager 125 to receive bandwidth allocation information and dynamically assigns a price criterion to each of a plurality of viewing options based at least in part on the bandwidth allocation information. The pricing system 135 may also communicate with the DHCT 14 and/or the billing system 130 to transmit pricing information (such as price criteria) to the subscriber and track the price criteria associated with the programs viewed by the subscriber. The subscriber's viewing options may consist of the choices the subscriber has for viewing one or more programs and/or random-access features that may be used while viewing the programs. The price criteria assigned by the pricing system 135 may comprise viewing fees, discounts associated with particular viewing options or with a particular subscriber, redemptive award points, usage fees based on bandwidth consumption (i.e. use of bandwidth by a particular viewing option or random access feature), or any other criteria relating to the costs and/or discounts associated with one or more viewing options and/or bandwidth allocation.

For billing purposes, in one embodiment, VOD transactions are stored in the flash memory part of system memory 112 or in some other designated non-volatile memory section of DHCT 14 as purchase transactions occur. VOD transaction records and associated fees (such as the price criteria associated with the viewing options used by the subscriber) are transmitted upstream via the OOB upstream channel at designated scheduled times (e.g., during low bandwidth consumption periods). Alternatively, the VOD application server may periodically poll individual DHCTs 14 or group of DHCTs to collect their respective VOD transaction history. VOD transaction records received from subscriber's DHCT by the VOD application server are debited from subscriber's respective account.

Referring still to FIG. 4, in one embodiment of the present invention, the bandwidth allocation manager 125 is in communication with the VOD application server 115, the network manager 120, and, preferably, the DHCT 14 and pricing system 135. It will be appreciated by one of ordinary skill in the art, however, that such communication can be established in a number of ways and does not require that there be a direct connection between each of the components. For example, the bandwidth allocation manager 125 may communicate with the VOD application server 115 indirectly by transmitting and receiving information to and from the network manager 120 which then communicates with the VOD application server 115. Similarly, the bandwidth allocation manager 125 may communicate with the DHCT 14 and pricing system 135 indirectly either through the network manager 120 or through the VOD application server 115. Likewise, any communication can be established with any headend component that interfaces a first VOD component to a second VOD component. The bandwidth allocation manager 125 may receive one or more allocation criteria from any one of the above referenced components in communication with the bandwidth allocation manager.

Allocation criteria may comprise one or more received preference sets input by one or more subscribers. Alternatively, the allocation criteria may comprise input from the DBDS system operator, or input from a subscriber or the system operator. The bandwidth allocation manager 125 uses the allocation criteria to determine a bandwidth allocation schedule that divides the available bandwidth between the different types of DTCs for each period in time.

Numerous allocation criteria may be used to determine a bandwidth allocation schedule. According to one aspect of the invention, the allocation criteria comprises one or more subscriber criteria. The subscriber criteria may comprise subscriber preferences selected by the subscriber from a series of preference fields presented to the subscriber via a graphical user interface displayed on the display or TV driven by DHCT 14. The subscriber may select particular preferences, or enter additional data, using any of numerous input devices such as a wireless remote control device or a wired or wireless keyboard. Alternatively, a subscriber may select one of a multiplicity of choices displayed for each preference field as displayed and presented in a GUI. The GUI may include data from a VOD catalogue as described above, including pricing information or pricing alternatives. Examples of subscriber preference data may include movie start times, movie titles, the degree of random access functionality (i.e., the amount of control over movie play desired), or a particular fee that the subscriber is willing to pay (which may be based on one or more price criteria). If the subscriber is presented with a GUI of subscriber preference fields, the subscriber may also be given the option of "don't care" for one or more of the fields. The subscriber may also be given the option of entering multiple sets of preferences, each containing one or more sets of subscriber preferences. The subscriber may also be given the option to order preference sets according to the subscriber's desired priority. An entry for a preference field may be repeated in one or more, and possibly all, preference sets. For instance, the subscriber may enter the same movie title in all preference sets or the same starting time.

In addition, the subscriber may enter a preferred content delivery mode for the movie in a fifth preference field. Since the level of random access functionality is implied by the selected delivery mode, in yet another embodiment, the preference field for the level of random access functionality is replaced with the field for a preferred delivery mode. In another embodiment, the DHCT 14 may include program logic capable of presenting a GUI to subscriber wherein subscriber can eliminate choices that would ordinarily be displayed in respective list for each respective preference field. In this way, a subscriber may, for instance, eliminate undesired delivery modes, undesired start times (such as very late), or undesired high service fees. Subsequently to such interactive configuration sessions, when the subscriber invokes a session to enter his/her viewing preferences for the purchase of a movie service, the GUI presentation does not display the respective eliminated entries for each list associated with a preference field.

According to another aspect of the present invention, the bandwidth allocation manager 125 allocates the available bandwidth based, at least in part, on subscriber criteria comprising a subscriber request received from a subscriber, such as a request for a VOD service according to one or more subscriber preferences as discussed above. To appreciate the advantages of the present invention, it is useful to first set forth a common method used to fulfill a VOD request. In a typical DBDS, for each VOD request it is necessary to set up a "session" between the DHCT 14 and the video server 110. Upon the subscriber instantiating a purchase of a VOD service for a price via the displayed GUI (i.e., the subscriber enters input via an input device and such input may comprise a password or PIN to authenticate authorization to purchase service), a purchase transaction is executed by CPU 110 or some other processor in DHCT 14 that causes a session to be set-up between DBDS resources to the DHCT 14. A session is a logical entity used to define a connection between the DHCT 14 and the video server 110 and the resources used to maintain that connection in the DBDS. The signaling required to implement the session is defined by the MPEG-2 standard's ISO/IEC 13818-6 IS (MPEG-2 DSM-CC). Upon a session setup request generated by the DHCT 14 (usually in response to a request from a subscriber), the network manager 120 verifies the eligibility of the DHCT 14 to receive the VOD service being requested and then passes the request to the VOD application server 115. If the VOD application server 115 determines that it can deliver the service, it communicates with the network manager 120 to reserve the network resources required to deliver the VOD service. The network manager 120 allocates the requested resources, including the necessary bandwidth, and sends a message back to the VOD application server 115 to indicate that the requested resources have been allocated. This message contains MPEG-2 transport stream ID, identifying the physical connection from the video server 110 to the headend 26, and the connectivity from the QAM 135 to the Hub 34 in which the DHCT 14 is connected. The amount of bandwidth that will be reserved for the duration of the VOD session is also communicated. The VOD application server 115 sends a message to the DHCT 14 that indicates that it is ready to begin delivering the video content using the resources allocated. The DHCT 14 receives information in the message identifying the QAM Modulator that is transmitting the video content (and hence where to tune to receive the requested content) and the bandwidth allocated to deliver the service. After a session has been established, the DHCT 14 communicates directly with the VOD application server 115 to facilitate delivery of the requested VOD service. Throughout the course of time that a VOD service is active further messaging is conducted between the respective DHCT 14 receiving the VOD service and the VOD application server 115 to monitor the status of the session. Thus, the VOD server can monitor that a session is properly functioning and determine whether the subscriber has invokes any random access feature of the VOD service.

The procedures for requesting and delivering of a VOD service can be quite complex, especially when there are more requests than there are available VOD bandwidth resources. Advantageously, according to one aspect of invention, the bandwidth allocation manager 125 eliminates some of these problems by dynamically determining bandwidth allocation based on subscriber criteria. Because the bandwidth is not pre-allocated to certain types of DTCs that transmit content according to predetermined delivery modes, the bandwidth allocation manager can dynamically adjust bandwidth allocation in response to a subscriber criterion. This allows the bandwidth allocation manager 125 to either set up a VOD session according to several well-known methods such as that described above, or to choose an alternative delivery method to broadcast the requested VOD service without necessitating a VOD session. For example, since the bandwidth allocation manager 125 receives the subscriber request prior to determining a bandwidth allocation schedule, the bandwidth allocation manager 125 has the option to fulfill the request using any available bandwidth. Hence, if no or a small number of subscribers have requested a particular movie that is planned to be transmitted according to a pay-per-view model, then the bandwidth allocation manager can "recapture" that bandwidth and allocate it to fulfill a subscriber request during the same time period if it is to result in a more financially advantageous bandwidth allocation.

Additionally, when a movie is paused or stopped for a significant period of time, the VOD application server 115 may communicate to the network manager 120 and/or the bandwidth allocation manager 125 that the bandwidth allocated to the respective DHCT 14 consuming the VOD service may be reallocated. The bandwidth allocation manager may also aggregate multiple subscriber requests for the same VOD service that are received at approximately the same time. Instead of allocating bandwidth to fulfill each subscriber request, the bandwidth allocation manager 125 may instead choose to fulfill the subscriber requests by delivering the requested VOD service according to an alternative delivery mode such as broadcasting the requested service according to one of the NVOD models described above. Hence, the bandwidth allocation manager 125 may base the bandwidth allocation schedule in part on subscriber criteria comprising one or more subscriber requests.

In another aspect of the invention, the bandwidth allocation manager 125 determines a bandwidth allocation schedule (and thus allocates the available bandwidth) based on allocation criteria comprising a subscriber reservation request. The subscriber reservation request is a request initiated by the subscriber to view a particular service at a particular time in the future. According to this aspect of the invention, the DHCT 14 includes a VOD reservation application that allows a user to select video content from a catalog of available services and to select the date and time that they wish to view the video. The VOD reservation application may also allow the user to select the level of random-access functionality desired while viewing the movie. In addition, the reservation application may display the fees and/or price criteria associated with the reservation viewing options. The VOD reservation application may comprise software loaded onto existing DHCT messaging utilities, or additional hardware programmed to provide the requisite functionality. Providing the DHCT 14 with a list of available video content, reservation times, and respective pricing alternatives can be done in a similar fashion to providing data for an EPG service. Typically, the list of available content and respective pricing information is compiled by the VOD application server 115 after incorporating pricing information from pricing system 135 and transferred to the DHCT 14 either automatically or upon transmittal of a request by the DHCT 14. A VOD Catalogue of movie titles with pricing information may be presented to the subscriber through an easy-to-use graphical user interface. For example, the GUI may comprise a series of fields similar to that described above with regard to the subscriber preference fields.

In one embodiment of the present invention, after selecting the date and time of the reservation request, the subscriber enters input via an input device, such as infrared remote control device, that instigates the DHCT 14 to transmit a message to the network manager 120 requesting that the network manager 120 reserve the necessary resources to transmit the video content at the requested time. This messaging can be accomplished using communication capabilities facilitated by the two-way DBDS network and the two-way capable DHCT 14. Alternatively, in a one-way network, DHCT 14 can communicate data to the headend via a telephone modem. The network manager 120 then communicates the subscriber reservation request to the bandwidth allocation manager 125. It will be appreciated that the bandwidth allocation manager 125 may be configured so as to communicate directly with the DHCT 14, thus eliminating the need for the message to be passed through the network manager 120. After the subscriber reservation request is received by the bandwidth allocation manager 125, it is stored by the bandwidth allocation manager 125 until such time as the bandwidth allocation manager 125 initiates a bandwidth allocation event. Alternatively, the reservation request may be stored in the network manager 120 and retrieved by the bandwidth allocation manager 125 when it begins a bandwidth allocation event.

The bandwidth allocation event is the process initiated by the bandwidth allocation manager 125 wherein the bandwidth allocation manager collects the stored allocation criteria, including any subscriber criteria such as VOD service requests and any subscriber reservation requests, and processes these criteria to determine a bandwidth allocation schedule. In one embodiment, a residual amount of bandwidth is allocated to accommodate last minute viewing requests for subscribers that wish to pay a considerably higher service fee. Advantageously, the bandwidth allocation manager 125 does not need to pre-allocate a fixed amount of bandwidth to particular types of DTCs or to particular content delivery modes prior to determining an optimal bandwidth allocation and delivery mode for a particular time period. Instead, the bandwidth allocation manager 125 can utilize and adapt the amount of bandwidth for delivering VOD services or other on-demand services. Alternatively, the cable operator may choose to assign a predetermined amount of bandwidth to be allocated by the bandwidth allocation manager based on the allocation criteria. A statistical model described below may be used to project the proportions of bandwidth allocated for a variety of priced reservation types while also incorporating flexibility to adjust the various parts of bandwidth.

Hence, video content can be transmitted using any of several well-known content delivery modes such as pay-per-view, NVOD, VOD, or any combination thereof, depending on the resources available at a particular time. If the subscriber reservation reserves video content during an off-peak period where bandwidth is readily available, the bandwidth allocation manager 125 may communicate with the network manager and the VOD application server 115 to initiate a true VOD session at the time of the subscriber's reservation. On the other hand, if demand is high for a particular time period, the bandwidth allocation manager 125 may explore other content delivery options to fulfill the subscriber requests more efficiently According to yet another aspect of the present invention, the bandwidth allocation manager 125 may also comprise means to transmit a message to subscribers notifying them that their reservation request has been fulfilled. The bandwidth allocation manager 125 may communicate directly with the subscriber's DHCT 14, or it may transmit the message to the network manager 120, which passes the message to the DHCT 14. Alternatively, the subscriber can place a phone call and navigate through a phone-activated menu in which he/she enters personal information and assigned identification to learn the status of his request. Alternatively, the subscriber can employ a computer connected to the Internet or DHCT 14 to use an Internet browser or similar Internet navigation tool to log on to a secured web site, enter a user identification and password, and learn the status of his/her request. Thus, this messaging, as well as any other messaging between the subscriber and components in the DBDS, can be accomplished using any of several methods well known in the art.

In the event that a particular subscriber reservation request is not or cannot be fulfilled by the bandwidth allocation schedule determined by the bandwidth allocation manager 125, the bandwidth allocation manager 125 may send a message to the subscriber notifying them that their reservation could not be fulfilled. The message may also include information on other viewing options available to the subscriber together with one or more price criteria associated with the viewing options as described in detail below.

According to another embodiment of the present invention, the bandwidth allocation manager 125 may determine the bandwidth allocation schedule based on a combination of multiple allocation criteria such as a predetermined statistical model or an adaptive statistical model that continually evolves based on changes in allocation criteria. In this embodiment, the allocation criteria may comprise subscriber criteria (e.g. VOD requests, subscriber reservation requests, and subscriber profile data) and allocation criteria received from other sources such as subscriber billing and pricing information (including the subscriber's willingness to pay a higher premium for added convenience and functionality), content delivery mode information, program content information (such as a program's prior success), and priority data associated with the subscriber. The priority data associated with the subscriber may comprise information that gives the requests of one subscriber priority over the requests of another subscriber such that certain subscriber requests are given preference over others based on assigned priority data. The assigned priority data may be used to provide subscriber incentives or to reward subscribers for frequent purchases, etc. The assigned priority data may also be associated with the subscriber's profile and used to determine one or more price criteria associated with one or more viewing option. It will be appreciated that the above list of possible allocation criteria is merely illustrative and that numerous other allocation criteria may be considered in determining the bandwidth allocation schedule. Advantageously, the bandwidth allocation manager 125 may receive these allocation criteria from any of a number of sources. For example, the DHCT 14 may include logic means to store subscriber profile data that includes information about the subscriber's past viewing patterns.

In a preferred embodiment, the bandwidth allocation manager processes the allocation criteria according to a statistical model that is designed to result in a bandwidth allocation suitable for a particular goal. The statistical model may assign different weights to different allocation criteria in order to emphasize the impact a specific criterion has on the bandwidth allocation schedule. The statistical model can be predetermined to produce a particular result such as maximizing the total number of subscriber requests fulfilled (such as requests for VOD access and pay-per-view access) or maximizing the revenue generated from the available bandwidth. For example, if the bandwidth allocation manager 125 receives a large number of requests for particular video content such as a popular movie to be transmitted at approximately the same time, the bandwidth allocation manager 125 may allocate several channels to broadcast that content according to an NVOD delivery model so that the most highly requested video content is available without necessitating initiation of a VOD session. The bandwidth allocation manager 125 may also provide the ability to broadcast the video content in progressively non-decreasing staggered start times or non-linear time-spaced intervals so that a greater number of subscriber requests can be fulfilled.

For example, if fifty percent of the subscriber reservations request delivery of particular video content at approximately 8:00 and the other fifty percent request video content at approximately 8:45, the bandwidth allocation manager 125 may broadcast the content over several channels at predetermined intervals of varying length to not only comply with the subscriber requests, but also to comply with normal subscriber viewing patterns. Thus, in the above example, the bandwidth allocation manager 125 may elect to broadcast the video content at 7:58, 8:00, 8:01, 8:03, and 8:07 and then again at 8:40, 8:45, and 8:48. These intervals may be chosen based on the subscriber reservation requests and, optionally, prior subscriber viewing patterns. The subscriber, in most cases, will not even be aware that they are sharing their reserved viewing times with other subscribers. Advantageously, the bandwidth allocation manager 125 provides the ability to broadcast the video content in an efficient manner that frees bandwidth previously allocated but unused and allows more subscribers to purchase a movie and reduces the likelihood of not granting service to subscribers wishing to view a movie.

The statistical model used by the bandwidth allocation manager 125 to determine the bandwidth allocation schedule may also be predetermined based on human or machine analysis of the bandwidth consumption (or request for bandwidth) history of a significant number of subscribers over a significant period of time. The analysis of bandwidth consumption history may also comprise analysis of the bandwidth usage pattern according to the respective day of week, time of day, time of year, proximity of time to holidays, and other time events. The predetermined model may also take into account demographics and geographic characteristics.

Alternatively, the statistical model may be non-static and evolve over time as new allocation criteria are collected and analyzed. In this embodiment, the bandwidth allocation manager 125 or some other associated device comprises means for gathering and storing allocation criteria and continually analyzing the stored data. Thus, as new allocation criteria are collected, stored and analyzed, the statistical model continues to evolve and update its statistics at preset intervals such as weekly, daily, monthly etc. This embodiment may also comprise real-time statistical analysis capabilities wherein the statistical model continues to dynamically evolve, on a real-time basis by monitoring and detecting when any significant change in bandwidth demand or when any different bandwidth consumption pattern merits a revision of the statistical model.

Advantageously, the present invention provides extraordinary flexibility in allocating finite bandwidth. It is important to note, however, that the bandwidth allocation manager 125 serves a dual purpose. First, it allows bandwidth to be pre-scheduled based on, among other things, subscriber criteria. Second, it provides a means for dynamically managing bandwidth resources on a real-time basis by adaptively invoking in parallel one or more of a multiplicity of bandwidth allocation schemes for granting movie viewing and on-demand services, while informing subscribers to accept a level of compromise as imposed by sharing bandwidth allocation over not receiving a service at all. For instance, in the event that the bandwidth allocation manager determines that a particular subscriber reservation request cannot be fulfilled (such as when there is insufficient available bandwidth), the bandwidth allocation manager 125 may provide the subscriber the option of viewing the movie at a different time. Alternatively, a subscriber may be asked to accept an NVOD delivery model with reduced random-access functionality. A subscriber may also be asked to delay or wait a certain period of time until the requested movie viewing can commence to capture a larger number of subscribers that have requested to view the same movie at approximately the same time. Similarly, the subscriber may be offered the option of paying a higher fee to view the program as requested. In this instance, the bandwidth allocation manager may alter the previous bandwidth allocation if it is more profitable to do so based on the subscriber's willingness to pay a higher fee.

Numerous unique combinations of content delivery may be adaptively employed to better allocate finite bandwidth resources. The following paragraphs detail several unique examples of the various bandwidth allocation schedules that may be adaptively and dynamically employed. According to one possible bandwidth allocation schedule, multiple instances of a popular program may be broadcast to efficiently use available bandwidth resources by controlling the plurality of starting times in a non-staggered manner by employing a scheduling method based on the two different repetition aspects. First, the movie is repeatedly broadcast with start times spread out at longer time intervals. For instance, equal longer time intervals (e.g., 30 minutes or hour increments, or a combination of both) may demarcate the starting-time repetition of the movie. Secondly, the repetition rate of the movie's starting time between the longer time intervals is conducted at progressively non-decreasing time-spaced intervals. Thus, instead of equally-spaced smaller time intervals, the smaller intervals within the time window enveloped by the longer intervals progress in their time separation and thus emulate a non-linear progression rate. The re-broadcast of a movie at non-linear non-decreasing time intervals ceases when a start time matches or surpasses the recurring start time of the movie scheduled with the next start time demarcated by the longer time interval.

Another possible allocation schedule may employ a non-linear progression rate with start times that double the time separation between the two previous start times. Yet another possible alternative is for the non-linear progression of the movie's start time may also be selected to be proportionate to the duration of time that a typical individual consumes to perform any of a multiplicity of personal activities that instigates the pausing or stopping of the movie play or the time to perform ordinary random-access operations (reverse and re-play operations). Such duration of times or personal activities are gathered from statistical data on a large number of consumers and may represent activities such as: answering a phone call; attending door bell; microwaving popcorn; restroom breaks, and personal hygiene.

According to another possible allocation schedule, bandwidth for movie viewing and on-demand services is managed according to a series of recurring sub-schedules consisting of a multiplicity of non-overlapping time intervals. Preferably, the time intervals vary in length and are established with demarcation according to collected historical data of subscriber consumption patterns of on-demand services. Pricing for each respective service (i.e., VOD, NVOD, PPV, etc.) may or may not vary in each of the respective time intervals. Hence, bandwidth for movie viewing and on-demand services may be configured to adapt in a time-specific manner according to a plan. The system bandwidth allocated for program viewing and on-demand services may be configured to switch as time progresses from a first allocation sub-schedule to a second allocation sub-schedule according to a main schedule that specifies the time interval when each of two or more sub-schedules is to be active. In this embodiment, only one configurable sub-schedule is active at a time throughout the configurable recurring schedule but a first configurable sub-schedule may be active throughout one or more distinct and non-overlapping time intervals of the configurable recurring schedule. The recurrence of the schedule is configured to one of a multiplicity of time periods such as a weekly, daily, or a monthly recurring schedule.

According to another possible bandwidth allocation schedule, a multiplicity of time-adaptive schedules for each of a multiplicity of recurring schedule choices are pre-configured. In this embodiment, the cable system operator may monitor the bandwidth and on-demand service usage and be given the option of manually implementing one of the pre-configured allocation schedules without following a plan. Alternatively, the network manager 120 may automatically monitor bandwidth usage and on-demand service usage and the bandwidth allocation manager 125 may communicate with the network manager 120, the pricing system 135, and the VOD application server 115 to automatically select one of the pre-configured schedules and/or modify or adjust the pricing of one or more selected services. For instance, six different configurations may be available for time-adaptive management of the bandwidth allocated for movie viewing and on-demand services for a daily recurring schedule. On the other hand, more than six different arrangements may be necessary when implementing time-adaptive 2-0 bandwidth management on a weekly recurring schedule.

According to another possible allocation schedule, several recurring sub-schedules may be utilized whereby on-demand services are offered with unrestricted random access functionality for one or more specific time intervals (e.g., 9:30 A.M. to 5:00 P.M. and/or 12:00 to 4:30 A.M.; during weekdays) when bandwidth for on-demand services is projected to be low according to collected historical data of subscriber consumption patterns. During peak periods, such as 5:00 to 11:59 P.M. of the week nights, the bandwidth allocation schedule may comprise an NVOD service featured with progressively non-decreasing staggered start times with a total number of channels that is less than the total number of requests for the same video on-demand service. A more restrictive form of random access features is provided with the NVOD service. During weekends, the bandwidth allocation schedule may be determined such that full random access functionality is only available during certain, low-demand time periods such as 6:00 to 11:00 A.M.

The bandwidth allocation schedule may also employ a small number of auxiliary channels, aggregated to support full random access functionality during a parallel NVOD service. Thus, a set of channels may be assigned for on-demand random access functionality in parallel with the NVOD service featured with progressively non-decreasing staggered start times. Because the activation of random access functionality by any subscriber tends to be for significantly shorter time intervals than for normal playback, bandwidth consumption for random access functionality is relatively small and a small number of auxiliary channels to support on-demand random access functionality are typically sufficient.

According to another possible bandwidth allocation schedule and another aspect of the present invention, the cable operator may assess a fee per time usage of the auxiliary channel bandwidth. Consequently, the subscriber consumes bandwidth for on-demand random access functionality fully aware that he/she is incurring a cost associated with the time that random access functionality is utilized or according to some other parameter. This may be achieved by assigning a price criterion to the on-demand random access viewing option as described in detail below. If on-demand random access functionality is not available instantaneously, the projected delay to provide the bandwidth necessary for the requested random-access feature is typically minimal. To fill the delay, the bandwidth allocation manager 125 or DHCT 14 may cause a temporary graphical or textual barker that indicates that the requested operation is in progress. In such way, the delay will appear shorter since the subscriber focuses attention to the displayed barker. The displayed barker may also display an input device (such as a remote control) key or button with instructions to press such key or button in the input device to cancel the requested on-demand random access operation. Furthermore, such key or button with associated canceling instructions may not be displayed at all unless the delay is significantly longer than expected.

Alternatively, the bandwidth allocation manager may act in conjunction with the VOD server and the DHCT 14 to simulate on-demand or random access features transparently by periodically comparing the time shifts between a plurality of broadcast versions of the movie (as determined by the bandwidth allocation schedule). For example, if a subscriber orders a program with Pause functionality and pauses the program, the bandwidth allocation manager may elect to recapture the unused bandwidth. When the user restarts the program, pausing functionality may be simulated by locating another broadcast or NVOD version of the program with a later start time that has reached a point in the program approximately equal to the point where the subscriber paused the program. If the subscriber purchases the program according to a content delivery mode that utilizes auxiliary channels, the subscriber may not incur the additional associated fee (as determined by one or more assigned price criteria) since auxiliary channel bandwidth was not utilized.

Alternatively, when a subscriber consumes on-demand random access functionality with bandwidth assigned via an auxiliary channel dedicated for on-demand random access, the subscriber has complete freedom to invoke random access functionality by activating respective dedicated keys or buttons in the input device (such as a wireless remote control device or a wired or wireless keyboard). Upon a bandwidth grant for on-demand random access functionality, the subscriber can initiate the process of reviewing a past portion of the movie by pressing a first key (or button) to play the movie in reverse playback mode, press a second key to pause the reverse playback mode, press a third key to replay the movie in normal play mode from the point that the reverse playback was paused, and to press a fourth key to play the movie in fast forward mode from the point wherein subscriber wishes not to replay the movie in normal play mode. Once the subscriber commences fast forward mode, the subscriber can pause the fast forward operation at the point he/she left off (or at any point he/she wishes) to restart normal play mode. At this point, the program logic such as the VOD on-demand application executing in DHCT 14 and/or program logic contained on the bandwidth allocation manager 125 may compare the time shifts between the plurality of broadcast version of the movie (according to the NVOD delivery mode with staggered start times) and the point of the movie wherein normal play is to resumed. If the program logic (located at either the DHCT 14 or the bandwidth allocation manager 125) determines that it is feasible to connect this subscriber to a broadcast version of the movie without significant delay, it may do so to conserve bandwidth resources. Consequently, the subscriber does not consume auxiliary channel bandwidth any longer, and at that point in time the subscriber ceases from incurring the additional fee associated with on-demand random access (as determined by one or more assigned price criteria).

Alternatively, the subscriber continues to consume the bandwidth of the auxiliary channel and the additional associated fee. If the software application determines that significant delay will be experienced to connect the subscriber's DHCT 14 to the broadcast version of the movie where the normal play mode is to resume, the program logic may query the subscriber via a graphical user interface (GUI) to select either to wait for the estimated amount of time or to incur additional dedicated bandwidth granted via one of the auxiliary channels. Random access functionality may also be assisted with a GUI whereby common keys of the input device are employed (e.g., arrow keys) to control cursor position and a separate "select or "enter" key is used to activate the respective random access key displayed with a graphical representation.

A GUI, or other interface may be used to display an indication of usage of a viewing option or an indication of an available alternate viewing option. For example, in one embodiment, a small graphical representation in a corner of the TV driven by DHCT 14, displays the running time pertaining to the consumption of bandwidth for on-demand random access and/or the additional associated fee. In this way the subscriber has visual feedback of how his/her on-demand random access consumption and the associated additional incurred expense. In another embodiment, the subscriber may be periodically presented with a GUI showing alternative viewing options that have a lower fee than the option currently being used by the subscriber. Thus, by assigning variable price criteria to one or more viewing options, subscribers may be encouraged to alter their viewing preferences to make more efficient use of bandwidth resources. In one embodiment, the subscriber navigates through a set of menus displayed via the GUI presentation to review past incurred fees in one or more formats such as: itemized service purchases (including the last purchase), fees for a period of time (e.g., last or a particular billing cycle); fees for a period of time by service type; fees for additional functionality such as random access for an itemized or last service purchase; or fees for additional functionality such as random access for a period of time.

The number of auxiliary channels to support on-demand random access functionality may be determined by the bandwidth allocation manager by employing an active statistical model that represents collected historical data of subscribers' bandwidth usage patterns for the different delivery modes and usage patterns for on-demand random access functionality as is described above.

In yet another embodiment of the present invention, the bandwidth allocation schedule may comprises one or more different types of a hybrid of content delivery modes featured in parallel, each type of service consuming a respective part of the total allocated bandwidth during a particular time interval and purchasable by subscriber for its respective pricing. Hence, during one or more time intervals, the total bandwidth allocated for video services may be divided with a first part appropriated for on-demand services with full random access functionality, a second part appropriated for NVOD services featured with progressively non-decreasing staggered start times with auxiliary channels to support on-demand random access, and a third part for NVOD services featured with progressively non-decreasing staggered start times but with restrictive random access support (that is, with pause and replay support only). Alternatively, during one or more time intervals, only one of a plurality of different types of video services may be offered thereby consuming the total bandwidth allocated for video services in whole. Similarly, during one or more time intervals, any combination of the plurality of different video services may be configured to run in parallel.

According to another aspect of the invention, the bandwidth allocation manager 125 communicates with the network manager 120 to allocate the predetermined bandwidth according to the bandwidth allocation schedule determined by the bandwidth allocation manager. Bandwidth allocation entails an assignment of system resources for a time interval for delivering a video service requested and purchased by a subscriber for a price according to the bandwidth allocation schedule. A time interval is characterized by a specific start time and duration. This may be accomplished by transmitting the bandwidth allocation schedule to the network manager after each bandwidth allocation event. Thus, the bandwidth allocation manager may continually communicate with the network manager to dynamically allocate bandwidth according to each new bandwidth allocation schedule.

According to another aspect of the present invention, the pricing system 135 communicates with the DHCT 14 and the bandwidth allocation manager 125 to provide pricing information associated with the subscriber's viewing options. According to this embodiment, the pricing system 135 receives bandwidth allocation information from the bandwidth allocation manager 125 as described above and, based at least in part on the bandwidth allocation information, assigns a price criterion to each of a plurality of available viewing options. The bandwidth allocation information may comprise information regarding the available bandwidth, the present and scheduled allocation of bandwidth, the content delivery modes associated with the bandwidth allocation, the viewing options available under various bandwidth allocation schemes, or any other information relevant to pricing information associated with the bandwidth allocation. The price criteria assigned by the pricing system 135 may comprise viewing fees, discounts associated with particular viewing options or with a particular subscriber, redemptive award points, usage fees based on bandwidth consumption, or any other criteria relating to the costs and/or discounts associated with one or more viewing options and/or bandwidth allocation schemes. Advantageously, the price criteria assigned to each viewing option may be used to encourage subscribers to make more efficient use of bandwidth resources. In addition, the bandwidth allocation manager 125 may alter the method in which bandwidth is allocated based on the subscriber's willingness to pay a higher price (as evidenced by their selection of viewing options with higher assigned price criteria).

The subscriber's viewing options comprise the choices the subscriber has for viewing one or more programs and/or using random-access features while viewing the programs. For example, a viewing option may comprise a reservation option, a normal-play option, a random access option, a pay-on-demand option, an adjust preference option, or any combination thereof. In the reservation option, the subscriber is preferably given the option of reserving a program for viewing at a specified date and time in the future. The subscriber may also be allowed to specify whether it desires full random access functionality, partial random access functionality (such as only pause and resume play capability), or no random access functionality, at the time the movie is shown.

A reservation made with more days or time in advance may be assigned a lower price. For example, a first reservation type may require a purchase transaction from a subscriber at least two weeks in advance for a first VOD title to be received during a first scheduled time. The first reservation may not be refundable or may impose a charge to: (1) modify the first scheduled time to a second scheduled time, (2) modify the first VOD title to a second VOD title, or (3) modify from a first service type (e.g., VOD) to a second service type (e.g., NVOD). Reservation types are demarcated by non-overlapping or overlapping time intervals in reference to when the service is to be rendered. In a preferred embodiment, the price of a reservation increases as the length of time from when a reservation is purchased to the time the service is rendered decreases. Pricing for a reservation type may also vary according to the time of day or day of the week that the service is scheduled.

In the normal-play option, the subscriber may be given the option to view a particular program without random-access functionality or a specific start time. Often the normal play option will be associated with a program that the bandwidth allocation manager 125 will broadcast at a predetermined time such that an unlimited number of subscribers may view the program without consuming additional bandwidth.

In the random access option, the subscriber may be given the option of viewing a program immediately or at a specified time in the future with full random-access functionality. The price criteria associated with this option may vary depending on the manner in which the bandwidth allocation manager 125 has allocated the available bandwidth resources and the content delivery modes being used to provide random access functionality.

In the on-demand random access option, the subscriber may be given the option of receiving random-access functionality for a limited period of time as is generally described above. For example, if the subscriber began viewing a program under the normal-play option and later desired to rewind the program, the subscriber may be given the option of utilizing random-access features for a limited period of time in order to rewind the program. This may be accomplished by providing random access functionality using one or more auxiliary channels in conjunction with the DTC being used for the normal play option. In this option, the pricing system may assign a price criteria based on a per/minute (or second) usage fee, particularly if the on-demand random access is achieved using a separate random access channel. This option may also be combined with other options to allow the subscriber to select a viewing option that suits their needs.

In the adjust viewing preference option, the subscriber is preferably given the option of altering their expressed preferences in order to facilitate more efficient usage of available bandwidth. For example, if a subscriber requests a program for a particular time with full random access functionality, the subscriber may be given the option of waiting 10 minutes to view the program with full random access or, alternatively, viewing the program immediately without random access functionality. Advantageously, this option may be used to offer subscribers less expensive viewing alternatives, thus encouraging subscribers to alter their viewing patterns to make more efficient use of available bandwidth resources.

It will be appreciated that the viewing options discussed above are merely illustrative and are not intended to limit the possible universe of viewing options. To the contrary, the bandwidth allocation manager 125 of the present invention makes numerous variable viewing options possible as bandwidth is allocated according to any of the numerous content delivery modes and/or bandwidth allocation schedules described above. The options available to a subscriber at a particular time may vary depending on the available bandwidth, the bandwidth allocation determined by the bandwidth allocation manager 125 and/or the content delivery modes or bandwidth allocation schedules utilized by the bandwidth allocation manager 125.

The type of price criteria assigned to each available viewing option may depend upon the characteristics of the viewing option. For example, the amount of a price criterion assigned to a viewing option (i.e. the amount the subscriber will pay if it uses the viewing option by selecting a program or by electing to use random access features) may depend on the time in which the program or feature is selected. Thus, the amount of the price criterion assigned to a viewing option wherein a program is to be viewed at 9:00 a.m. is likely to be significantly less than the amount of a price criterion assigned to a viewing option wherein a program is to be viewed at 8:00 p.m. or other peak periods. Similarly, the amount of an assigned price criterion may depend on the amount of bandwidth used by a particular viewing option, the availability of bandwidth resources at the time (or date) of the viewing option, etc. In addition, the amount of the price criterion may depend on the specific program associated with the viewing option such that newly released movies are assigned a higher price criterion.

Likewise, the type of price criteria assigned may depend on the particular viewing option as well. Viewing options such as on-demand random access may be assigned price criteria wherein bandwidth usage is charged via a per minute fee. The type of price criteria assigned may also depend on subscriber profile information as described below. Thus, a subscriber may be rewarded by assigning discounted price criteria or redemptive rewards points as the price criteria. Certain price criteria, such as redemptive rewards points, may be used to influence subscriber viewing patterns.

The manner in which the pricing criteria are assigned may also depend on the available viewing options, the bandwidth allocation information, or choices made by the cable operator. For example, according to one embodiment of the present invention, price criteria are assigned according to a predetermined schedule listing the price criteria to be assigned to each viewing option. In this embodiment, the pricing system 135 receives bandwidth allocation information from the bandwidth allocation manager 125 and uses the predetermined schedule to assign a price to each viewing option available under the current bandwidth allocation.

Alternatively, the amount and type of price criteria assigned to each available viewing option may be determined using a predefined statistical model similar to the statistical model described above with respect to the bandwidth allocation manager 125. According to another possible embodiment, the pricing system 135 may utilize a predefined algorithm that assigns pricing criteria by weighting bandwidth allocation information obtained from the bandwidth allocation manager 125, the subscriber profile, or external sources such as program ratings etc. In addition, the pricing system 135 may assign price criteria to each viewing option on a real-time basis, at predetermined intervals, or only in response to a subscriber request (as described below).

It will be appreciated that the manner in which the price criteria are assigned may vary according to the manner in which the bandwidth allocation manager 125 allocates bandwidth. Accordingly, each content delivery mode, bandwidth allocation schedule, and/or each bandwidth allocation statistical model may have a corresponding schedule and/or model used to determine the type and amount of the price criteria assigned to each viewing option. Therefore, each of the bandwidth allocation examples provided above may be associated with a particular pricing scheme under which the pricing system 135 assigns at least one price criterion to each viewing option currently available.

For example, in one embodiment of the present invention, price criteria may be assigned to each subscriber preference to indicate the cost to the subscriber of particular subscriber preferences. If the subscriber wishing to view a program is presented with a GUI as described above, the interface may include information regarding how much each additional preference will cost (as determined by the price criteria assigned to the viewing option). For example, the interface may offer the subscriber the option to select the level of random access functionality desired when viewing a movie. If the subscriber selects partial or full random access, the interface may display an additional cost that the subscriber will have to pay for the selected random access feature. Thus, the partial access option may cost $0.50 extra while full random access may cost $1.00 extra in addition to the base cost of viewing a particular movie.

In another embodiment of the present invention, price criteria are assigned based on an aggregate of the subscriber's selected viewing options, as opposed to specific preferences (which may also constitute individual viewing options). In this embodiment, the subscriber may be presented with an interface that shows the subscriber the available viewing options for a particular feature and the price associated with the particular option. For example, if the subscriber desires to watch a program at 9:00, he may be presented with a graphical menu that offers the options A through D. Option A may comprise viewing the program at 9:00 with no random access functionality for $4.00. Option B may comprise viewing the program at 9:00 with full random-access functionality for $6.00. Option C may comprise viewing the program at 9:45 with no random access for $3.00. Option D may comprise reserving the program for viewing at a later date or at a significantly different time for $2.00. Advantageously, the pricing system of the present invention enables the subscriber to choose from multiple viewing options that make more efficient use of the available bandwidth and take into account the subscriber's willingness to pay additional fees for added convenience or functionality.

In addition, the pricing system 135 of the present invention enables cable providers to charge different rates for viewing different program content. For example, if a subscriber wishes to view a program that is less popular, the pricing system 135 may assign a higher price criteria to that program than to a program which is very popular and is being broadcast using an NVOD content delivery mode. Thus, during peak periods, one program may cost $10.00 while another program may cost only $5.00. Advantageously, this results in more efficient (and more profitable) use of bandwidth because the additional subscribers may watch the program being broadcast using NVOD without consuming additional bandwidth. The higher fee associated with the less popular program encourages subscribers to watch the program already being broadcast as opposed to consuming additional resources. Moreover, this enables the cable operator to offer a wide variety of programs without wasting bandwidth on programs that are less in demand. If a subscriber is willing to pay a higher fee, then it may be more efficient (or more profitable) to allocate bandwidth to comply with the subscriber's request. If the subscriber is not willing to pay the higher fee, then the bandwidth is better allocated elsewhere.

It should also be noted that entirely different price criteria may be associated with a single program during other various viewing times. In off-peak time periods, each program may have the same basic price with additional random-access features available at a higher price while, in peak periods, the price criteria associated with each program may reflect the increased demand on the limited bandwidth resources. For example, during off-peak times when bandwidth is readily available, numerous programs may be available for the same low price (such as $3.00). However, the same program offered for $3.00 during off-peak periods may cost $10.00 during peak periods. Advantageously, such pricing schemes enable cable operators to influence subscriber viewing patterns to make more efficient use of bandwidth during off-peak times.

According to another aspect of the present invention, the pricing system 135 may adaptively assign price criteria to each available viewing option on a real-time or near real-time basis such that the price assigned to a particular viewing option may change as bandwidth is allocated differently or more bandwidth is used (or made available). Hence, the price criteria assigned to each viewing option may be updated at periodic (or non-periodic) intervals. For example, each of the options listed above may change if the viewing times are shifted in either direction or if the subscriber desires to view the program on a different day. Thus, at peak viewing times such as Saturday evenings, the price criteria assigned to full random access options may be very high (such as three or four times the normal price) because the bandwidth at peak times is used more efficiently by allocating it to other content delivery modes.

It will be appreciated that numerous combinations of viewing options may arise depending on the subscriber's preferences and/or the manner in which the bandwidth is allocated. Advantageously, the pricing system 135 of the present invention provides the flexibility to adaptively assign price criteria, regardless of the viewing options available. For example, as described above, the subscriber may be given the option of obtaining on-demand random access functionality using bandwidth assigned via an auxiliary channel dedicated for on-demand random access. In this circumstance, the pricing system may assign price criteria comprising a per/minute charge using the on-demand random access functionality. The pricing system may also dynamically assign a different price criteria if the subscriber chooses to cease using the on-demand random access functionality and continue viewing the program using a different content delivery mode (as described above).

According to another aspect of the present invention, the pricing system 135 may also assign a price criterion to a viewing option based in part on subscriber profile data. As described above, subscriber profile data may comprise information regarding the subscriber's past viewing patterns, the amount and type of the subscriber's previous program purchases, the type of viewing plan used by the subscriber, or other information regarding the subscriber. The pricing system 135 may take this information into account when assigning a price criterion to a particular viewing option for a particular subscriber. For example, if a subscriber is considered a valued customer or has reached a preset threshold qualifying them for a preferential price criterion, the amount of the price criteria assigned to a particular viewing option may be less than it would be otherwise. This may be accomplished by receiving subscriber profile data from the DHCT 14, the bandwidth allocation manager 125, or the billing system 130 and reducing the amount of the assigned price criteria based, at least in part, on that information.

According to another aspect of the present invention, the pricing system 135 may receive a subscriber request related to one or more of the available viewing options and transmit at least one price criterion related to one or more of the available viewing options to the subscriber in response to the request. The subscriber request may comprise a request for a price criteria for a viewing option, a request for viewing a program according to a viewing option, a request for a list of available viewing options or any of numerous other requests wherein the information requested is associated with price criteria. For example, if the subscriber desires to view a particular program, they may request price criteria for each of the viewing options available for that program for a particular time (or for a particular period of time such as a day, week or month). In response, the pricing system 135 may transmit the price criteria for each viewing option to the subscriber. This may be accomplished by transmitting the price criteria to the DHCT 14 which may then display the information to the subscriber via a 601 or series of menus as described above.

Alternatively, the subscriber request may comprise an indirect request that is generated by the DHCT 14 in response to an action taken by the subscriber. For example, if the subscriber selects a program that is not available, the DHCT 14 may request price criteria for other available viewing options and/or programs. Similarly, the DHCT 14 may request price criteria when the subscriber selects a particular feature such as pause or other random access functionality. It will be appreciated, however, that the pricing system 135 may also transmit price criteria for each available viewing option to the DHCT 14 at predefined times or intervals. In this embodiment, the price criteria are preferably stored on the DHCT 14 and retrieved as necessary to provide pricing information for various viewing options.

According to another aspect of the present invention, the DHCT 14 contains a local storage device (not shown) such as a hard drive, either internally connected to the DHCT 14 or externally connected to the DHCT 14 via a storage device interface port (not shown) such as SCSI or IDE or a communication port (not shown) such as USB or IEEE-1394. In addition, the DHCT 14 may comprise a decryption subsystem and capabilities to decrypt encrypted VOD titles and prohibit replication of locally-stored VOD titles. The security processor may be part of the decryption subsystem. The pricing system 135 assigns a price criteria to allow the subscriber to receive the VOD title in encrypted fashion via the DHCT's DBDS interface 106 or OOB tuner 108 ahead of time at a lower bit rate and record and store the VOD stream in the DHCT's local storage device. The subscriber is offered full random access functionality. For an additional price, the subscriber is allowed to view the movie over an extended period of time upon which on expiration, the VOD client programmed application executing within DHCT 14 erases the encrypted movie from the storage device. Alternatively, for an additional price the subscriber is allowed to view the movie in its entirety for a finite number of repetitions. Since the movie is stored in the local storage device of the DHCT 14, additional viewings do not need to reflect a considerably higher price.

Many modifications and other embodiments of the invention will come to mind to one skilled in the art to which this invention pertains having the benefit of the teachings presented in the foregoing descriptions and the associated drawings. Therefor, it is to be understood that the invention is not limited to the specific embodiments disclosed and that modifications and other embodiments are intended to be included within the scope of the appended claims. Although specific terms are employed herein, they are used in a generic and descriptive sense only and not for purpose of limitation.

The invention claimed is:

1. A method for dynamically pricing viewing options in a digital broadband delivery system, the method comprising:
   receiving bandwidth allocation schedule information describing a division of bandwidth during a plurality of time periods, the division of bandwidth being between at least a first service and a second service provided by the digital broadband delivery system to a plurality of digital home communication terminals; and
   dynamically assigning a price criterion to each of a group of viewing options for a video program, each viewing option associated with a content delivery mode, the assignment based at least in part on the bandwidth allocation schedule information.

2. The method of claim 1, further comprising receiving a subscriber request related to at least one viewing option selected from the group of viewing options.

3. The method of claim 2, wherein receiving the subscriber request comprises receiving a subscriber request that comprises a request for a list of available viewing options.

4. The method of claim 2, further comprising transmitting a price criterion for the viewing option to the subscriber in response to the subscriber request.

5. The method of claim 1, wherein dynamically assigning the price criterion to a group of viewing options comprises dynamically assigning a price criterion to each of a group of viewing options, wherein the group of viewing options comprises one of a reservation option, a random access option, and an on-demand random access option.

6. The method of claim 5, wherein dynamically assigning a price criterion to a group of viewing options comprises dynamically assigning a price criterion to a group of viewing options wherein the price criterion assigned to the random access option comprises a fee associated with a length of time that random access features are employed.

7. The method of claim 1, wherein dynamically assigning a price criterion to a group of viewing options comprises dynamically assigning a price criterion to a group of viewing options wherein the price criterion is based at least in part on one of subscriber profile data and subscriber priority data.

8. The method of claim 1, wherein dynamically assigning a price criterion to a group of viewing options comprises dynamically assigning a price criterion to a group of viewing options, wherein the price criterion comprises one of a subscriber incentive and a subscriber reward.

9. The method of claim 1, further comprising sending the assigned price criterion for at least one of the group of viewing options to a subscriber.

10. A pricing system for a digital broadband delivery system wherein the digital broadband delivery system comprises a bandwidth allocation manager and wherein the pricing system receives bandwidth allocation schedule information describing a division of bandwidth during a plurality of time periods, the division of bandwidth being between at least a first service and a second service provided by the digital broadband delivery system to a plurality of digital home communication terminals, and dynamically assigns a price criterion to each of a group of viewing options for a video program, each viewing option associated with a content delivery mode, the assignment based at least in part on the bandwidth allocation information.

11. The pricing system of claim 10, wherein the pricing system receives a subscriber request related to at least one viewing option selected from the group of viewing options.

12. The pricing system of claim 11, wherein the subscriber request received by the pricing system comprises a request for a list of available viewing options.

13. The pricing system of claim 11, wherein the pricing system transmits at least one price criterion to the subscriber in response to the subscriber request.

14. The pricing system of claim 10, wherein the group of viewing options comprises one of a reservation option, a random access option, and an on-demand random access option.

15. The pricing system of claim 14, wherein price criterion assigned to the random access option comprises a fee associated with a length of time that random access features are employed.

16. The pricing system of claim 10, wherein the price criterion for at least one viewing option selected from the group of viewing options is based at least in part on at least one of subscriber profile data and subscriber priority data.

17. The pricing system of claim 10, wherein the price criterion for at least one viewing option selected from the group of viewing options comprises one of a subscriber incentive and a subscriber reward.

18. A headend in a digital broadband delivery system comprising:
a bandwidth allocation manager that produces a bandwidth allocation schedule by dynamically assigning one of a plurality of content delivery modes to each of a plurality of digital transmission channels for each of a plurality of time periods, resulting in a division of bandwidth between the plurality of content delivery modes for each of the time periods; and
a pricing system that receives bandwidth allocation information, from the bandwidth allocation manager describing the division of bandwidth between the content delivery modes, and that dynamically assigns a price criterion to each of a group of viewing options based at least in part on the bandwidth allocation information received from the bandwidth allocation manager.

19. The headend of claim 18, wherein the pricing system receives a subscriber request related to at least one viewing option selected from the group of viewing options.

20. The headend of claim 19, wherein the subscriber request received by the pricing system comprises a request for a list of available viewing options.

21. The headend of claim 19, wherein the pricing system transmits at least one price criterion to the subscriber in response to the subscriber request.

22. The headend of claim 18, wherein the group of viewing options comprises one of a reservation option, a random access option, and an on-demand random access option.

23. The headend of claim 22, wherein price criterion assigned to the random access option comprises a fee associated with the length of time that random access features are employed.

24. The headend of claim 18, wherein the price criterion for at least one viewing option selected from the group of viewing options is based at least in part on one of subscriber profile data, subscriber priority data, and subscriber priority data.

25. The headend of claim 18, wherein the price criterion for at least one viewing option selected from the group of viewing options comprises one of a subscriber incentive and a subscriber reward.

26. The headend of claim 18, wherein the bandwidth allocation information comprises information from the bandwidth allocation schedule.

27. A digital broadband delivery system comprising:
a bandwidth allocation scheduler that dynamically assigns one of a plurality of content delivery modes to each of a group of digital transmission channels for each of a plurality of time periods, resulting in a division of bandwidth between the plurality of content delivery modes for each of the time periods;
a pricing system that receives bandwidth allocation information, from the bandwidth allocation manager, describing the division of bandwidth between the content delivery modes, and that dynamically assigns a price criterion to each of a group of viewing options based at least in part on the bandwidth allocation information; and
a digital home communication terminal comprising an interface that receives a subscriber request regarding one of the group of viewing options and a tuner that transmits the subscriber request to the headend.

28. The digital broadband delivery system of claim 27, wherein the digital home communication terminal further comprises an interface for displaying a price criterion received from the headend in response to the subscriber request.

29. The digital broadband delivery system of claim 27, wherein the digital home communication terminal further comprises an interface for displaying a menu comprising at least two viewing options selected from the group of viewing options and the price criteria assigned to the at least two viewing options.

30. The digital broadband delivery system of claim 27, wherein the digital home communication terminal further comprises an interface for displaying an indication of usage of a viewing option.

31. The digital broadband delivery system of claim 30, wherein the interface for displaying an indication of usage of a viewing option comprises an interface for displaying one of elapsed time, time remaining, and cost incurred through use of a viewing option.

32. The digital broadband delivery system of claim 30, wherein the interface for displaying an indication of usage of a viewing option comprises an interface for displaying the indication of usage of a viewing option intermittently.

33. The digital broadband delivery system of claim 30, wherein the interface for displaying an indication of usage of a viewing option comprises an interface for displaying the indication of usage of a viewing option in response to the occurrence of a predefined event.

34. The digital broadband delivery system of claim 33, wherein the predefined event comprises one of a change in usage of a viewing option, use of a random access feature associated with a viewing option, and expiration of an elapsed time period.

35. The digital broadband delivery system of claim 27, wherein the digital home communication terminal further comprises an interface for displaying an indication of an available alternate viewing option.

36. The digital broadband delivery system of claim 35, wherein the interface for displaying an indication of an available alternate viewing option comprises a selectable icon representing a menu of available alternate viewing options.

37. The digital broadband delivery system of claim 35, wherein the interface for displaying an indication of an available alternate viewing option comprises an interface for displaying the indication of an available alternate viewing option in response to the occurrence of a predefined event.

38. The digital broadband delivery system of claim 35, wherein the predefined event comprises one of a change in usage of a viewing option, use of a random access feature associated with a viewing option, expiration of an elapsed time period, and a change in available alternate viewing options.

39. The digital broadband delivery system of claim 27, wherein the subscriber request received by the digital home communication terminal comprises one of a request for a price criterion for a viewing option, a request for viewing a program according to a viewing option, and a request for a list of available viewing options.

40. The digital broadband delivery system of claim 27, wherein the group of viewing options comprises one of a reservation option, a normal-play option, a random access option, an on-demand random access option, and an adjust preference option.

41. The digital broadband delivery system of claim 40, wherein the price criterion assigned to the random access option comprises a fee associated with a length of time that random access features are employed.

42. The digital broadband delivery system of claim 27, wherein the price criterion for at least one viewing option selected from the group of viewing options is based at least in part on one of subscriber profile data, subscriber priority data, time of bandwidth consumption, and a subscriber viewing time preference.

43. The digital broadband delivery system of claim 27, wherein the digital home communication terminal further comprises a storage device for storing content associated with a viewing option.

44. The digital broadband delivery system of claim 43, wherein the digital home communication terminal downloads content associated with a viewing option during a time period of low bandwidth consumption and stores the content in the storage device for later retrieval.

\* \* \* \* \*